(12) United States Patent
Griffin et al.

(10) Patent No.: US 12,367,089 B2
(45) Date of Patent: Jul. 22, 2025

(54) QUANTUM SERVICE CIRCUIT BREAKER

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 211 days.

(21) Appl. No.: 18/076,825

(22) Filed: Dec. 7, 2022

(65) Prior Publication Data

US 2024/0193026 A1 Jun. 13, 2024

(51) Int. Cl.
*G06F 11/07* (2006.01)
*G06F 9/50* (2006.01)
*G06N 10/80* (2022.01)

(52) U.S. Cl.
CPC .......... *G06F 11/076* (2013.01); *G06F 9/5038* (2013.01); *G06F 11/0709* (2013.01); *G06N 10/80* (2022.01)

(58) Field of Classification Search
CPC ............... G06F 11/076; G06F 11/0709; G06F 9/5038; G06N 10/80
See application file for complete search history.

(56) References Cited

U.S. PATENT DOCUMENTS

| | | | |
|---|---|---|---|
| 10,996,979 B2 | 5/2021 | Bishop et al. | |
| 11,455,694 B2 | 9/2022 | DiNunzio et al. | |
| 11,574,030 B1* | 2/2023 | Harrigan | G06N 10/60 |
| 11,842,250 B2* | 12/2023 | Zheng | G06N 3/045 |
| 2020/0201655 A1 | 6/2020 | Griffin et al. | |
| 2020/0285539 A1* | 9/2020 | Fowler | G06F 11/1076 |
| 2020/0351087 A1 | 11/2020 | Mccandlish et al. | |
| 2020/0358606 A1* | 11/2020 | Zhao | H04L 9/12 |
| 2021/0326058 A1 | 10/2021 | Lee et al. | |
| 2022/0308916 A1 | 9/2022 | Griffin et al. | |

FOREIGN PATENT DOCUMENTS

CN 112769550 A 5/2021

* cited by examiner

*Primary Examiner* — Jigar P Patel
(74) *Attorney, Agent, or Firm* — Dority & Manning, P.A.

(57) ABSTRACT

A quantum computing device determines a plurality of quantum services executing on one or more quantum computing systems. The quantum computing device accesses a dependency map identifying dependency relationships between the plurality of quantum services. The quantum computing device determines computing resource sensitivities for at least some quantum services of the plurality of quantum services. The quantum computing device determines based on the computing resource sensitivities for a quantum service from among the plurality of quantum services that the quantum service exceeds a computing resource sensitivity threshold for the quantum service. The quantum computing device, in response to determining that the quantum service exceeds the computing resource sensitivity threshold, initiates an action based on priority rules.

20 Claims, 12 Drawing Sheets

QUANTUM SERVICE CIRCUIT BREAKER

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement a quantum service circuit breaker that stops cascading failures of quantum services. In particular, the quantum service circuit breaker can detect that a quantum service is operating outside the normal parameters (i.e., failing) for the quantum service and initiate an action to stop cascading failures of quantum services that depend on the failing quantum service. The quantum service circuit breaker can pause a quantum service that a failing quantum service depends on or is dependent on or instantiate a new version of the failing quantum service and direct the quantum services that depend on or are dependent on the failing quantum service to use the new version of the quantum service.

In one example, a method for stopping cascading failures of quantum services is disclosed. The method includes determining, by a quantum computing device, a plurality of quantum services executing on one or more quantum computing systems. The method further includes accessing, by the quantum computing device, a dependency map identifying dependency relationships between the plurality of quantum services. The method further includes determining, by the quantum computing device, computing resource sensitivities for at least some quantum services of the plurality of quantum services. The method further includes determining, by the quantum computing device based on the computing resource sensitivities for a quantum service from among the plurality of quantum services, that the quantum service exceeds a computing resource sensitivity threshold for the quantum service. The method further includes in response to determining that the quantum service exceeds the computing resource sensitivity threshold, initiating, by the quantum computing device based on priority rules, an action.

In another example, a quantum computing device for stopping cascading failures of quantum services is disclosed. The quantum computing device comprises a system memory, and a processor device communicatively coupled to the system memory. The processor device is to determine a plurality of quantum services executing on one or more quantum computing systems. The processor device is further to access a dependency map identifying dependency relationships between the plurality of quantum services. The processor device is further to determine computing resource sensitivities for at least some quantum services of the plurality of quantum services. The processor device is further to determine, based on the computing resource sensitivities for a quantum service from among the plurality of quantum services, that the quantum service exceeds a computing resource sensitivity threshold for the quantum service. The processor device is further to in response to determine that the quantum service exceeds the computing resource sensitivity threshold, initiate, based on priority rules, an action.

In another example, a non-transitory computer-readable storage medium is disclosed. The non-transitory computer-readable storage medium stores thereon computer-executable instructions that, when executed, cause one or more processor devices to determine a plurality of quantum services executing on one or more quantum computing systems. The instructions further cause the processor device to access a dependency map identifying dependency relationships between the plurality of quantum services. The instructions further cause the processor device to determine computing resource sensitivities for at least some quantum services of the plurality of quantum services. The instructions further cause the processor device to determine, based on the computing resource sensitivities for a quantum service from among the plurality of quantum services, that the quantum service exceeds a computing resource sensitivity threshold for the quantum service. The instructions further cause the processor device to in response to determine that the quantum service exceeds the computing resource sensitivity threshold, initiate, based on priority rules, an action.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
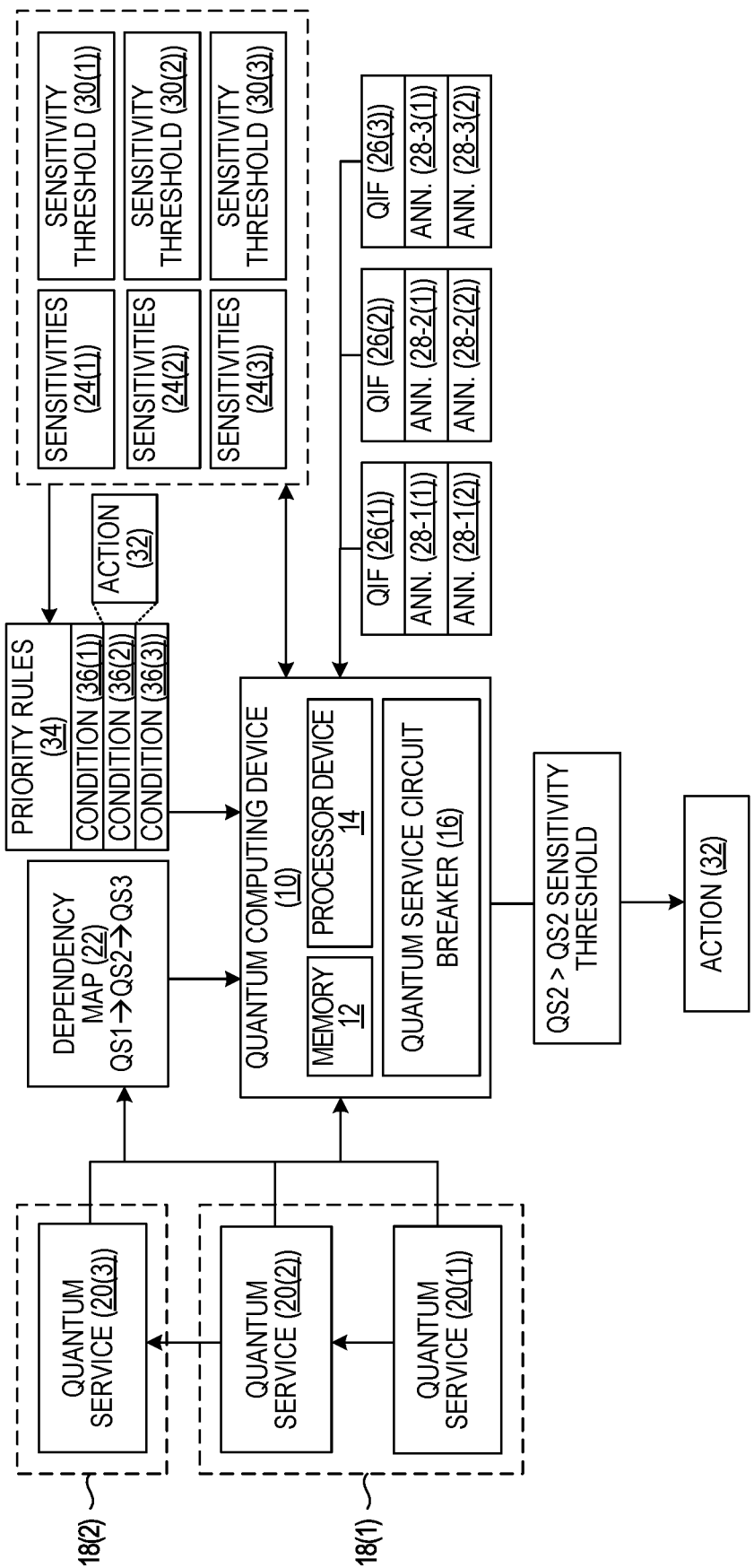
FIG. 1 is a block diagram of a quantum computing device in which examples of stopping cascading failures of quantum services may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

In quantum computing, the failure of a quantum service executing in a quantum computing system can disrupt workflow. When other quantum services depend on the failing quantum service, the other quantum services may also fail, causing decoherence or rendering the quantum computing system unusable.

The quantum service circuit breaker can take steps to stop the cascading failures of dependent quantum services when a quantum service fails. The quantum service circuit breaker can access a dependency map that indicates which quantum services within quantum computing systems depend on each other. The quantum service circuit breaker can detect that a quantum service is operating outside the normal parameters for the quantum service and takes steps towards achieving quantum service stability or quantum computing system stability based on the dependencies of the quantum services.

The quantum service circuit breaker can monitor computing resource metrics and sensitivities that correspond to the quantum services and the quantum computing systems. The quantum service circuit breaker can use the dependency map and the computing resource sensitivities together to detect that a quantum service is operating outside the normal parameters for that quantum service.

The steps that the quantum service circuit breaker can take to stabilize the quantum service or the quantum computing system may be based on rules that determine the action to take when a quantum service fails. The priority rules may relate to a computing resource metric and indicate a particular action to take when the metric is below a specified level. Actions that the quantum service circuit breaker can take may include instantiating a copy of the quantum service to load balance in an elastic manner, restarting quantum services, pausing quantum services, or terminating quantum services. Based on the dependency map, the quantum service circuit breaker can notify upstream and downstream dependent quantum services of an interruption in the quantum service, such as pausing or terminating the quantum service, and allow for data preservation and rerouting of information. As a result, the execution path of the quantum service can be preserved or alternative execution paths can be created to survive the failure of the quantum service. Additionally, a failure of the quantum computing system can be avoided, which can cause the failure of all components of the quantum computing system if failure is not avoided.

FIG. 1 is a block diagram of a quantum computing device 10 that comprises a memory 12, a processor device 14, and a storage device. It is to be understood that the quantum computing device 10 in some examples may include constituent elements in addition to those illustrated in FIG. 1. In the example of FIG. 1, the quantum computing device 10 implements a quantum service circuit breaker 16 that performs stopping cascading failures of quantum services.

In the example of FIG. 1, the quantum computing device 10 implements a set of one or more qubits for use by quantum services executed by the quantum computing device 10. To maintain information for the qubit(s), the quantum computing device 10 includes a qubit registry, which comprises a plurality of qubit registry entries each corresponding to a qubit such as the one or more qubits. The qubit registry maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries of the qubit registry also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum service circuit breaker 16 may determine a plurality of quantum services executing on one or more quantum computing systems. For example, a first quantum computing system 18(1) may comprise a first quantum service 20(1) and a second quantum service 20(2), and a second quantum computing system 18(2) may comprise a third quantum service 20(3). In other examples, the first quantum computing system 18(1) may comprise the first quantum service 20(1) or one or more quantum services in addition to the first quantum service 20(1) and the second quantum service 20(2). In another example, the second quantum computing system 18(2) may comprise one or more quantum services in addition to the third quantum service 20(3). In other implementations, there may be additional quantum computing systems that execute one or more quantum services in addition to the first quantum computing system 18(1) and the second quantum computing system 18(2). In another implementation, there may be one quantum computing system that executes one or more quantum services. The quantum service circuit breaker 16 may monitor the task manager of the one or more quantum computing systems (e.g., 18(1), 18(2)) for running requests in order to determine the plurality of quantum services (e.g., 20(1), 20(2), 20(3)) executing on the one or more quantum computing systems.

The first quantum computing system 18(1) and the second quantum computing system 18(2) of FIG. 1 each execute one or more quantum services, such as the first quantum service 20(1), the second quantum service 20(2), and the third quantum service 20(3). The quantum services (e.g., 20(1), 20 (2), 20(3)) are processes that employ qubits such as the one or more qubits to provide desired functionality. Execution of the quantum services (e.g., 20(1), 20(2), 20(3)) is facilitated by a quantum service manager and a quantum service scheduler on each quantum computing system (e.g., 18(1), 18(2)) where the quantum service executes. The quantum service manager of the quantum computing system (e.g., 18(1), 18(2)) handles operations for creating, monitoring, and terminating quantum services, while the quantum service scheduler of the quantum computing system (e.g., 18(1), 18(2)) controls the scheduling of quantum services for execution by a processor device, and allocation of processing resources to executing quantum services. The functionality of the quantum service manager and the quantum service scheduler may be made accessible to other processes (e.g., via a defined application programming interface (API), as a non-limiting example).

The quantum service circuit breaker 16 may access a dependency map 22 that identifies dependency relationships between the plurality of quantum services (e.g., 20(1), 20(2), 20(3)). The dependency relationships can identify quantum services (e.g., 20(1), 20(2), 20(3)) that depend on other quantum services and quantum services that do not depend on other quantum services. For example, the dependency map 22 may indicate that the first quantum service 20(1) depends on the second quantum service 20(2) and that the second quantum service 20(2) depends on the third quantum service 20(3). Additionally, the dependency map 22 may indicate, for example, that no quantum service is dependent on the first quantum service 20(1) and that the third quantum service 20(3) does not depend on a quantum service.

In some examples, the quantum services (e.g., 20(1), 20(2), 20(3)) with dependency relationships may be in the same quantum computing system. For instance, the dependency map 22 may indicate that the first quantum service 20(1) depends on the second quantum service 20(2), where both the first quantum service 20(1) and the second quantum service 20(2) execute in the first quantum computing system 18(1). In other examples, the quantum services (e.g., 20(1), 20(2), 20(3)) with dependency relationships may be in different quantum computing systems. For instance, the dependency map 22 may indicate that the second quantum service 20(2) depends on the third quantum service 20(3), where the second quantum service 20(2) executes in the first quantum computing system 18(1) and the third quantum service 20(3) executes in the second quantum computing system 18(2). Thus, the dependency map 22 allows for a view of the upstream and downstream dependencies of the plurality of quantum services (e.g., 20(1), 20(2), 20(3)) in one or more quantum computing systems (e.g., 18(1), 18(2)).

The quantum service circuit breaker 16 may determine computing resource sensitivities for at least some quantum services of the plurality of quantum services (e.g., 20(1), 20(2), 20(3)). For example, the quantum service circuit breaker 16 may determine a first computing resource sensitivities 24(1) for the first quantum service 20(1), a second computing resource sensitivities 24(2) for the second quantum service 20(2), and a third computing resource sensitivities 24(3) for the third quantum service 20(3). Thus, the first computing resource sensitivities 24(1) may correspond to the first quantum service 20(1), the second computing resource sensitivities 24(2) may correspond to the second quantum service 20(2), and the third computing resource sensitivities 24(3) may correspond to the third quantum service 20(3). The quantum service circuit breaker 16 may determine computing resource sensitivities for one or more quantum services of the plurality of quantum services (e.g., 20(1), 20(2), 20(3)), and not another one or more quantum services of the plurality of quantum services (e.g., 20(1), 20(2), 20(3)). For example, the quantum service circuit breaker 16 may determine the first computer resource sensitivities 24(1) for the first quantum service 20(1) and the second computer resource sensitivities 24(2) for the second quantum service 20(2), and not determine computer resource sensitivities for the third quantum service 20(3).

The computing resource sensitivities (e.g., 24(1), 24(2), 23(3)) may each comprise one or more computing resource sensitivity. Each computing resource sensitivity that comprises the computing resource sensitivities (e.g., 24(1), 24(2), 23(3)) can correspond to a computing resource of a quantum service from among the plurality of quantum services (e.g., 20(1), 20(2), 20(3)). For example, a computing resource sensitivity of the first computing resource sensitivities 24(1) may correspond to the first quantum service 20(1) and a computing resource of the first quantum service 20(1). Each computing resource sensitivity that comprises the computing resource sensitivities (e.g., 24(1), 24(2), 23(3)) can correspond to a computing resource of the quantum computing system where the quantum service executes. For example, a computing resource sensitivity of the first computing resource sensitivities 24(1) may correspond to the first quantum service 20(1) and a computing resource of the first quantum computing system 18(1) when the first quantum service 20(1) executes on the first quantum computing system 18(1).

The quantum service circuit breaker 16 can determine the computing resource sensitivities (e.g., 24(1), 24(2), 23(3)) for at least some quantum services of the plurality of quantum services (e.g., 20(1), 20(2), 20(3)) by obtaining a quantum instruction file that corresponds to a quantum service for each of the quantum services of the plurality of quantum services. Then, for each quantum service of the plurality of quantum services (e.g., 20(1), 20(2), 20(3)), the quantum service circuit breaker 16 can read annotations in the quantum instruction file that corresponds to the quantum services indicating levels of computing resources at a time when a decrease in performance of the quantum service occurs.

For example, the quantum service circuit breaker 16 may obtain a first quantum instruction file 26(1) that corresponds to the first quantum service 20(1), a second quantum instruction file 26(2) that corresponds to the second quantum service 20(2), and a third quantum instruction file 26(3) that corresponds to the third quantum service 20(3). The quantum instruction file (e.g., 26(1), 26(2), 26(3)) may be a Quantum Assembly (QASM) file or any other component that contains a list of instructions that can be executed on a quantum computing device (e.g., 10) in a quantum computing system (e.g., 18(1), 18(2)). A QASM repository may contain QASM files, and the quantum service circuit breaker 16 may access the QASM repository to obtain the QASM file that corresponds to a quantum service of the plurality of quantum services (e.g., 20(1), 20(2), 20(3)), such as by accessing the task manager and using the service id of the quantum service from the task manager to access the QASM repository and obtain the QASM file that corresponds to the quantum service.

The quantum instruction file (e.g., 26(1), 26(2), 26(3)) may contain one or more annotations that each indicate a level of computing resources at a time when a decrease in performance of the quantum service occurs. The quantum service circuit breaker 16 can read the annotations in the quantum instruction file (e.g., 26(1), 26(2), 26(3)) for at least some quantum services of the plurality of quantum services (e.g., 20(1), 20(2), 20(3)). For example, the quantum service circuit breaker 16 may read a first annotation 28-1(1) and a second annotation 28-1(2) in the first quantum instruction file 26(1) that corresponds to the first quantum service 20(1). Similarly, the quantum service circuit breaker 16 may read a first annotation 28-2(2) and a second annotation 28-2(2) in the second quantum instruction file 26(2) that corresponds to the second quantum service 20(2). The quantum service circuit breaker 16 can also read a first annotation 28-3(1) and a second annotation 28-3(2) in the third quantum instruction file 26(3) that corresponds to the third quantum service 20(3). Because the quantum instruction file (e.g., 26(1), 26(2), 26(3)) corresponds to a quantum service (e.g., 20(1), 20(2), 20(3)), the annotations in the quantum instruction file also correspond to the quantum service. Thus, the first annotation 28-1(1) and the second annotation 28-1(2) correspond to the first quantum service 20(1), the first annotation 28-2(1) and the second annotation 28-2(2) correspond to the second quantum service 20(2), and the first annotation 28-3(1) and the second annotation 28-3(2) correspond to the third quantum service 20(3). The annotations may therefore indicate levels of computing resources at a time when a decrease in performance of the corresponding quantum service occurs. The levels of computing resources in the annotations may correspond to one or more computing resources of the quantum computing system (e.g., 18(1), 18(2)) where the quantum service (e.g., 20(1), 20(2), 20(3)) that corresponds to the annotation and the quantum instruction file (e.g., 26(1), 26(2), 26(3)) executes.

In other examples, the quantum service circuit breaker 16 may determine the computing resource sensitivities (e.g., 24(1), 24(2), 23(3)) for at least some quantum services of the plurality of quantum services (e.g., 20(1), 20(2), 20(3)) by testing the quantum services in simulators or from descriptors in the quantum instruction file (e.g., 26(1), 26(2), 26(3)) that corresponds to a quantum service (e.g., 20(1), 20(2), 20(3)).

The quantum service circuit breaker 16 may determine that a quantum service from among the plurality of quantum services (e.g., 20(1), 20(2), 20(3)) exceeds a computing resource sensitivity threshold for the quantum service, based on the computing resource sensitivities (e.g., 24(1), 24(2), 24(3)) for the quantum service. In other examples, the quantum service circuit breaker 16 may determine that a quantum service from among the plurality of quantum services (e.g., 20(1), 20(2), 20(3)) is approaching a computing resource sensitivity threshold for the quantum service, based on the computing resource sensitivities (e.g., 24(1), 24(2), 24(3)) for the quantum service.

For example, the quantum service circuit breaker 16 may determine that the first quantum service 20(1) exceeds a first computing resource sensitivity threshold 30(1) based on the first computing resource sensitivities 24(1), which corresponds to the first quantum service 20(1). The first computing resource sensitivity threshold 30(1) may correspond to a computing resource of the first quantum computing system 18(1) when the first quantum service 20(1) executes on the first quantum computing system 18(1). The quantum service circuit breaker 16 may determine that the second quantum service 20(2) exceeds a second computing resource sensitivity threshold 30(2) based on the second computing resource sensitivities 24(2), which corresponds to the second quantum service 20(2). The second computing resource sensitivity threshold 30(2) may correspond to a computing resource of the first quantum computing system 18(1) when the second quantum service 20(2) executes on the first quantum computing system 18(1). The quantum service circuit breaker 16 may determine that the third quantum service 20(3) exceeds a third computing resource sensitivity threshold 30(3) based on the third computing resource sensitivities 24(3), which corresponds to the third quantum service 20(3). The third computing resource sensitivity threshold 30(3) may correspond to a computing resource of the second quantum computing system 18(2) when the third quantum service 20(3) executes on the second quantum computing system 18(2).

The quantum service circuit breaker 16 may determine that one or more quantum services from among the plurality of quantum services (e.g., 20(1), 20(2), 20(3)) exceeds computing resource sensitivity thresholds (e.g., 30(1), 30(2), 30(3)) for the quantum services, based on the computing resource sensitivities (e.g., 24(1), 24(2), 24(3)) for the quantum services. For example, the quantum service circuit breaker 16 may determine that both the first quantum service 20(1) exceeds the first computing resource sensitivity threshold 30(1) based on the first computing resource sensitivities 24(1) and the second quantum service 20(2) exceeds the second computing resource sensitivity threshold 30(2) based on the second computing resource sensitivities 24(2). In other examples, the quantum service circuit breaker 16 may determine that one or more quantum services from among the plurality of quantum services (e.g., 20(1), 20(2), 20(3)) is approaching computing resource sensitivity thresholds (e.g., 30(1), 30(2), 30(3)) for the quantum services, based on the computing resource sensitivities (e.g., 24(1), 24(2), 24(3)) for the quantum services. For example, the quantum service circuit breaker 16 may determine that both the first quantum service 20(1) is approaching the first computing resource sensitivity threshold 30(1) based on the first computing resource sensitivities 24(1) and the second quantum service 20(2) is approaching the second computing resource sensitivity threshold 30(2) based on the second computing resource sensitivities 24(2).

In response to determining that the quantum service exceeds the computing resource sensitivity threshold (e.g., 30(1), 30(2), 30(3)), the quantum service circuit breaker 16 can initiate an action 32 based on priority rules 34 in order to stabilize one or more of the quantum service, the quantum services from among the plurality of quantum services (e.g., 20(1), 20(2), 20(3)), and one or more of the quantum computing systems (e.g., 18(1), 18(2)). In other examples, the quantum service circuit breaker 16 can initiate the action 32 based on the priority rules 34 in response to determining that the quantum service is approaching the computing resource sensitivity threshold (e.g., 30(1), 30(2), 30(3)).

The priority rules 34 may comprise a list of one or more conditions that indicate the action 32 for the quantum service circuit breaker 16 to initiate in response to determining that the quantum service exceeds the computing resource sensitivity threshold (e.g., 30(1), 30(2), 30(3)). For example, the priority rules 34 may comprise a first condition 36(1), a second condition 36(2), and a third condition 36(3). Each condition (e.g., 36(1), 36(2), 36(3)) may correspond to the computing resource sensitivities (e.g., 24(1), 24(2), 24(3)) for at least some quantum services of the plurality of quantum services (e.g., 20(1), 20(2), 20(3)). For example, the first condition 36(1) may correspond to the first computing resource sensitivities 24(1), which corresponds to the first quantum service 20(1). The first condition 36(1) may correspond to a computing resource of the first quantum computing system 18(1) when the first quantum service 20(1) executes on the first quantum computing system 18(1). The second condition 36(2) may correspond to the second computing resource sensitivities 24(2), which corresponds to the second quantum service 20(2). The second condition 36(2) may correspond to a computing resource of the first quantum computing system 18(1) when the second quantum service 20(2) executes on the first quantum computing system 18(1). The third condition 36(3) may correspond to the third computing resource sensitivities 24(3), which corresponds to the third quantum service 20(3). The third condition 36(3) may correspond to a computing resource of the second quantum computing system 18(2) when the third quantum service 20(3) executes on the second quantum computing system 18(2).

When a condition (e.g., 36(1), 36(2), 36(3)) in the list of conditions of the priority rules 34 is satisfied, the action 32 corresponding to the condition may be initiated. For example, the first condition 36(1) may state to instantiate a new version of the first quantum service 20(1) when the first computer resource sensitivities 24(1) indicates an error count of the first quantum computing system 18(1) and the corresponding first computer resource sensitivity threshold 30(1) indicates that the threshold error count is exceeded, then the action 32 may be for the quantum service circuit breaker 16 to create a new instantiation of the first quantum service 20(1). In another example, the second condition 36(2) may state to pause the second quantum service 20(2) when the second computer resource sensitivities 24(2) indicates a heat level of the first quantum computing system 18(1) and the corresponding second computer resource sensitivity threshold 30(2) indicates that the threshold heat level is exceeded, then the action 32 may be for the quantum service circuit breaker 16 to pause the second quantum service 20(2) until the heat level decreases to a level below the threshold heat level indicated in the second computer resource sensitivity threshold 30(2). In another example, the third condition 36(3) may state to restart the third quantum service 20(3) when the third computer resource sensitivities 24(3) indicates an error rate of the third quantum service 20(3) and the corresponding third computer resource sensitivity threshold 30(3) indicates that the threshold error rate is exceeded, then the action 32 may be for the quantum service circuit breaker 16 to restart the third quantum service 20(3). In another example, the condition (e.g., 36(1), 36(2), 36(3)) may indicate that the error correction strategy can change based on the computer resource sensitivities (e.g., 24(1), 24(2), 24(3)).

It is to be understood that, because the quantum service circuit breaker 16 is a component of the quantum computing device 10, functionality implemented by the quantum service circuit breaker 16 may be attributed to the quantum computing device 10 generally. Moreover, in examples where the quantum service circuit breaker 16 comprises software instructions that program the processor device 14 to carry out functionality discussed herein, functionality implemented by the quantum service circuit breaker 16 may be attributed herein to the processor device 14. It is to be further understood that, while, for purposes of illustration only, the quantum service circuit breaker 16 is depicted as a single component, the functionality implemented by the quantum service circuit breaker 16 may be implemented in any number of components, and the examples discussed herein are not limited to any particular number of components.

Figure 2:
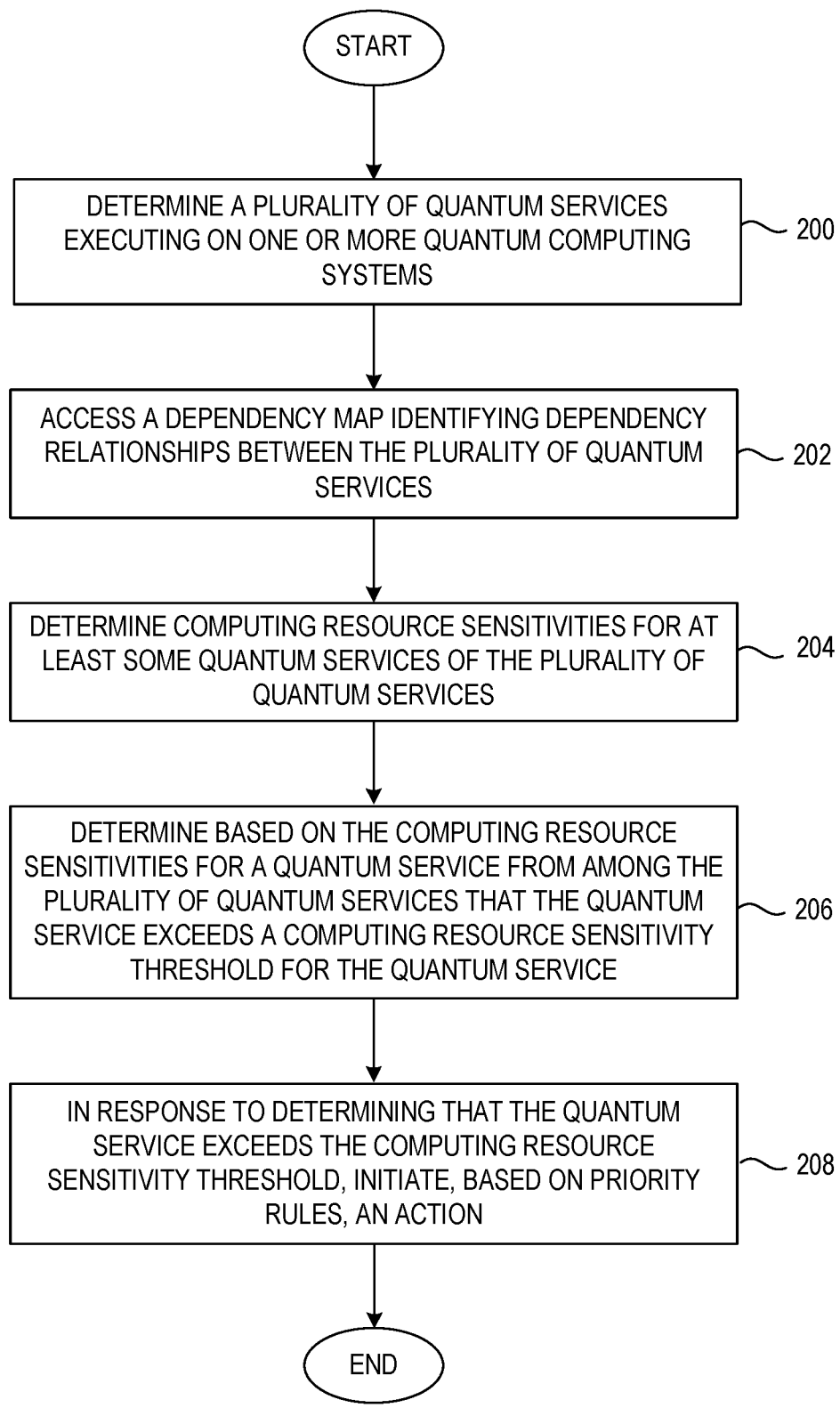
FIG. 2 is a flowchart illustrating operations performed by the quantum computing device of FIG. 1 for stopping cascading failures of quantum services, according to one example

To illustrate exemplary operations performed by the quantum computing device 10 of FIG. 1 for stopping cascading failures of quantum services for executing quantum services according to one example, FIG. 2 provides a flowchart. Elements of FIG. 1 are referenced in describing FIG. 2 for the sake of clarity.

In FIG. 2, operations begin with a processor device of a computing device, such as the processor device 14 of the quantum computing device 10 of FIG. 1, determining a plurality of quantum services (e.g., 20(1), 20(2), 20(3)) executing on one or more quantum computing systems (e.g., 18(1), 18(2)) (block 200). The processor device 14 then accesses a dependency map 22 identifying dependency relationships between the plurality of quantum services (e.g., 20(1), 20(2), 20(3)) (block 202). The processor device 14 then determines computing resource sensitivities (e.g., 24(1), 24(2), 24(3)) for at least some quantum services of the plurality of quantum services (e.g., 20(1), 20(2), 20(3)) (block 204). The processor device 14 then determines based on the computing resource sensitivities (e.g., 24(1), 24(2), 24(3)) for a quantum service from among the plurality of quantum services (e.g., 20(1), 20(2), 20(3)) that the quantum service exceeds a computing resource sensitivity threshold (e.g., 30(1), 30(2), 30(3)) for the quantum service (block 206). The processor device 14 then in response to determining that the quantum service exceeds the computing resource sensitivity threshold, initiates, based on priority rules 34, an action 32 (block 208).

Figure 3:
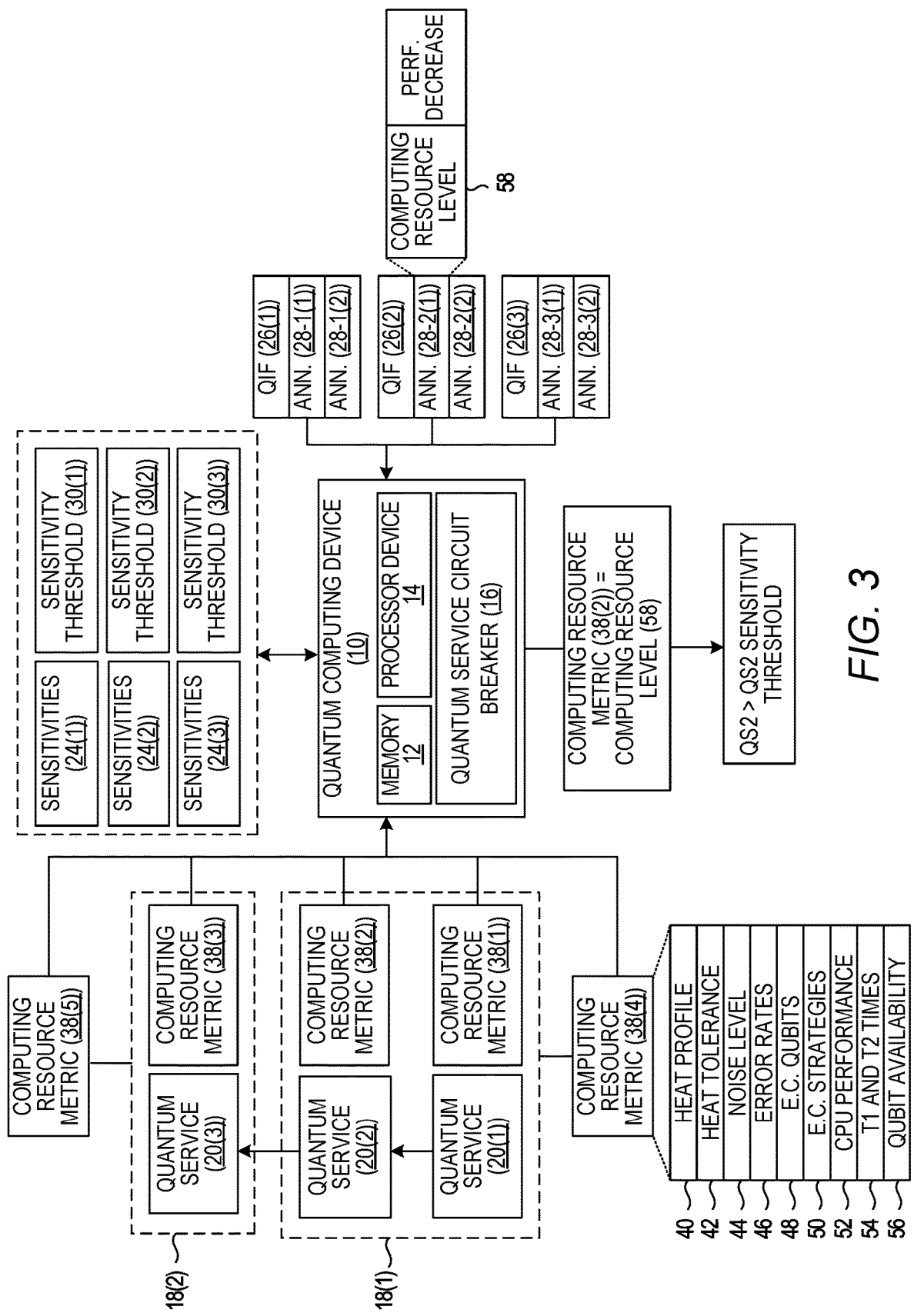
FIG. 3 is a block diagram of the quantum computing device of FIG. 1 for stopping cascading failures of quantum services, according to another example.

FIG. 3 is a block diagram of the quantum computing device 10 of FIG. 1 for stopping cascading failures of quantum services, according to one example. Elements of FIG. 1 are referenced in describing FIG. 3 for the sake of clarity. In the example of FIG. 3, the quantum service circuit breaker 16 may determine that the quantum service (e.g., 20(1), 20(2), 20(3)) exceeds the computing resource sensitivity threshold (e.g., 30(1), 30(2), 30(3)) by monitoring a computing resource metric of the one or more quantum computing systems (e.g., 18(1), 18(2)) and the plurality of quantum services (e.g., 20(1), 20(2), 20(3)) executing on the one or more quantum computing systems (e.g., 18(1), 18(2)). For example, the quantum service circuit breaker 16 may monitor one or more of a first computing resource metric 38(1) that indicates computing resources of the first quantum service 20(1), a second computing resource metric 38(2) that indicates computing resources of the second quantum service 20(2), a third computing resource metric 38(3) that indicates computing resources of the third quantum service 20(3), a fourth computing resource metric 38(4) that indicates computing resources of the first quantum computing system 18(1), and a fifth computing resource metric 38(5) that indicates computing resources of the second quantum computing system 18(2).

The computing resource metric (e.g., 38(1)-38(5)) may comprise one or more of a heat profile 40, a heat tolerance 42, a noise level 44, error rates 46, quantities of qubits for error correction 48, error correction strategies 50, CPU performance 52, T1 and T2 times 54, and qubit availability 56 of a quantum computing system (e.g., 18(1), 18(2)). In other examples, the computing resource metric (e.g., 38(1)-38(5)) may comprise one or more of the heat profile 40, the heat tolerance 42, the noise level 44, the error rates 46, the quantities of qubits for error correction 48, the error correction strategies 50, the CPU performance 52, the T1 and T2 times 54, and the qubit availability 56 of a quantum service (e.g., 20(1), 20(2), 20(3)).

The computing resource metric (e.g., 38(1)-38(5)) may define the normal operational parameters for the quantum service (e.g., 20(1), 20(2), 20(3)) or the quantum computing system (e.g., 18(1), 18(2)). For example, the first computing resource metric 38(1) may indicate the error rates 46 of the first quantum service 20(1) to be under 20% errors, thus the normal operational error rate of the first quantum service 20(1) is to be under 20% errors. The first computing resource sensitivity threshold 30(1) may be exceeded when the first quantum service 20(1) operates outside the normal operational error rate, such as the first quantum service 20(1) operating with over 20% errors.

The quantum service circuit breaker 16 may then obtain a quantum instruction file (e.g., 26(1), 26(2), 26(3)) that corresponds to the quantum service (e.g., 20(1), 20(2), 20(3)). For example, the quantum service circuit breaker 16 may monitor the first computing resource metric 38(1) that indicates computing resources of the first quantum service 20(1) and obtain the first quantum instruction file 26(1) that corresponds to the first quantum service 20(1). The quantum service circuit breaker 16 can then determine that an annotation in the quantum instruction file (e.g., 26(1), 26(2), 26(3)) identifies a computing resource level 58 that is associated with a decrease in performance of the quantum service (e.g., 20(1), 20(2), 20(3)). For example, the quantum service circuit breaker 16 may monitor the second computing resource metric 38(2) that indicates computing resources of the second quantum service 20(2), obtain the second quantum instruction file 26(2) that corresponds to the second quantum service 20(2), and determine that the first annotation 28-2(1) identifies a computing resource level 58 that is associated with a performance decrease in the second quantum service 20(2). For instance, the first annotation 28-2(1) in the second quantum instruction file 26(2) may identify the heat tolerance 42 of the second quantum service 20(2) where the second quantum service 20(2) decreases in performance.

The quantum service circuit breaker 16 may then determine that the computing resource metric (e.g., 38(1)-38(5)) matches the computing resource level 58. As a result, the quantum service circuit breaker 16 can determine that the quantum service (e.g., 20(1), 20(2), 20(3)) exceeds the computing resource sensitivity threshold (e.g., 30(1), 30(2), 30(3)) for the quantum service. The computing resource level 58 for a quantum service may correspond to the computing resource sensitivity threshold (e.g., 30(1), 30(2), 30(3)) for the quantum service. Thus, the computing resource metric (e.g., 38(1)-38(5)) matching the computing resource level 58 indicates that the computing resource sensitivity threshold (e.g., 30(1), 30(2), 30(3)) for the quantum service has been exceeded.

For example, the quantum service circuit breaker 16 may monitor the second computing resource metric 38(2) that indicates the heat tolerance 42 of the second quantum service 20(2), obtain the second quantum instruction file 26(2) that corresponds to the second quantum service 20(2), determine that the first annotation 28-2(1) identifies the heat tolerance 42 level of the second quantum service 20(2) where the second quantum service 20(2) decreases in performance (i.e., computing resource level 58), and determine that the heat tolerance 42 of the second quantum service 20(2) matches the heat tolerance 42 level of the second quantum service 20(2). The heat tolerance 42 level (i.e., computing resource level 58 where the second quantum service 20(2) decreases in performance) may correspond to the second computing resource sensitivity threshold 30(2), which may also indicate the same threshold heat tolerance 42 for the second quantum service 20(2). The quantum service circuit breaker 16 may then determine that the second quantum service 20(2) exceeds the second computing resource sensitivity threshold 30(2) because the heat tolerance 42 of the second quantum service 20(2) matches the heat tolerance 42 level of the second quantum service 20(2).

Figure 4:
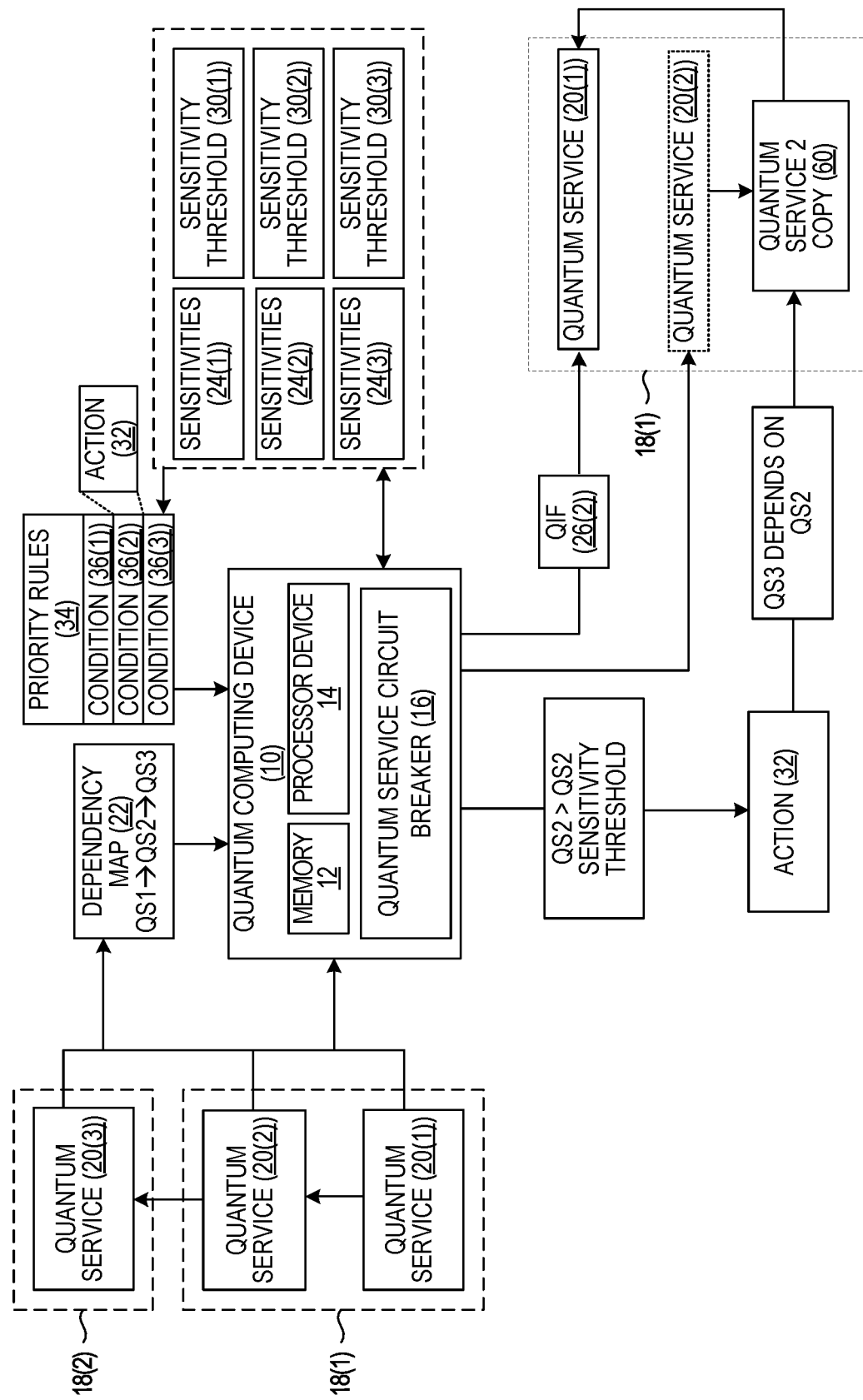
FIG. 4 is a block diagram of the quantum computing device of FIG. 1 for stopping cascading failures of quantum services, according to another example.

FIG. 4 is a block diagram of the quantum computing device 10 of FIG. 1 for stopping cascading failures of quantum services, according to one example. Elements of FIG. 1 are referenced in describing FIG. 4 for the sake of clarity. In the example of FIG. 4, the action 32 that the quantum service circuit breaker 16 can initiate may be to initiate a copy of the quantum service, direct dependent quantum services to use the copy of the quantum service, and terminate the quantum service. The copy of the quantum service may load balance in the same quantum computing system where the quantum service is executed or in a different quantum computing system from where the quantum service is executed. The quantum service circuit breaker 16 may determine the quantum services from among the plurality of quantum services (e.g., 20(1), 20(2), 20(3)) that are dependent on the quantum service based on the dependency map 22. The quantum service circuit breaker 16 may initiate a copy of the quantum service. For example, the second quantum service 20(2) may exceed the second computing resource sensitivity threshold 30(2) and the dependency map 22 may indicate that the first quantum service 20(1) depends on the second quantum service 20(2) and the second quantum service 20(2) depends on the third quantum service 20(3). The quantum service circuit breaker 16 may determine that the first quantum service 20(1) is dependent on the second quantum service 20(2) based on the dependency map 22. The quantum service circuit breaker 16 may initiate a second quantum service copy 60.

The quantum service circuit breaker 16 can initiate the copy of the quantum service by obtaining a quantum instruction file (e.g., 26(1), 26(2), 26(3)) corresponding to the quantum service, sending the quantum instruction file to the quantum services that are dependent on the quantum service, and executing the copy of the quantum service in a quantum computing system from among the one or more quantum computing systems (e.g., 18(1), 18(2)). The quantum instruction file (e.g., 26(1), 26(2), 26(3)) may be a QASM file or any other component that contains a list of instructions that can be executed on a quantum computing device (e.g., 10) in a quantum computing system (e.g., 18(1), 18(2)). The quantum service circuit breaker 16 may access the QASM repository to obtain the QASM file that corresponds to the quantum service that is being copied and send the QASM file to the quantum services that are dependent on the quantum service.

For example, the second quantum service 20(2) may exceed the second computing resource sensitivity threshold 30(2). The quantum service circuit breaker 16 may obtain the second quantum instruction file 26(2) that corresponds to the second quantum service 20(2). The dependency map 22 may indicate that the first quantum service 20(1) depends on the second quantum service 20(2) and quantum service circuit breaker 16 may determine that the first quantum service 20(1) is dependent on the second quantum service 20(2) based on the dependency map 22. The quantum service circuit breaker 16 can send the second quantum instruction file 26(2) to the first quantum service 20(1). The second quantum service copy 60 may then be executed in a quantum computing system, such as the first quantum computing system 18(1) or the second quantum computing system 18(2). The second quantum service copy 60 can execute on the same quantum computing system as the second quantum service 20(2) or a different quantum computing system.

The quantum service circuit breaker 16 may direct the quantum services that are dependent on the quantum service to use the copy of the quantum service. For example, the second quantum service 20(2) may exceed the second computing resource sensitivity threshold 30(2). The dependency map 22 may indicate that the first quantum service 20(1) depends on the second quantum service 20(2), and the quantum service circuit breaker 16 may determine that the first quantum service 20(1) is dependent on the second quantum service 20(2) based on the dependency map 22. The quantum service circuit breaker 16 may direct the first quantum service 20(1) to use the second quantum service copy 60 instead of the second quantum service 20(2). The quantum service circuit breaker 16 may then terminate the quantum service, such as the second quantum service 20(2).

Figure 5:
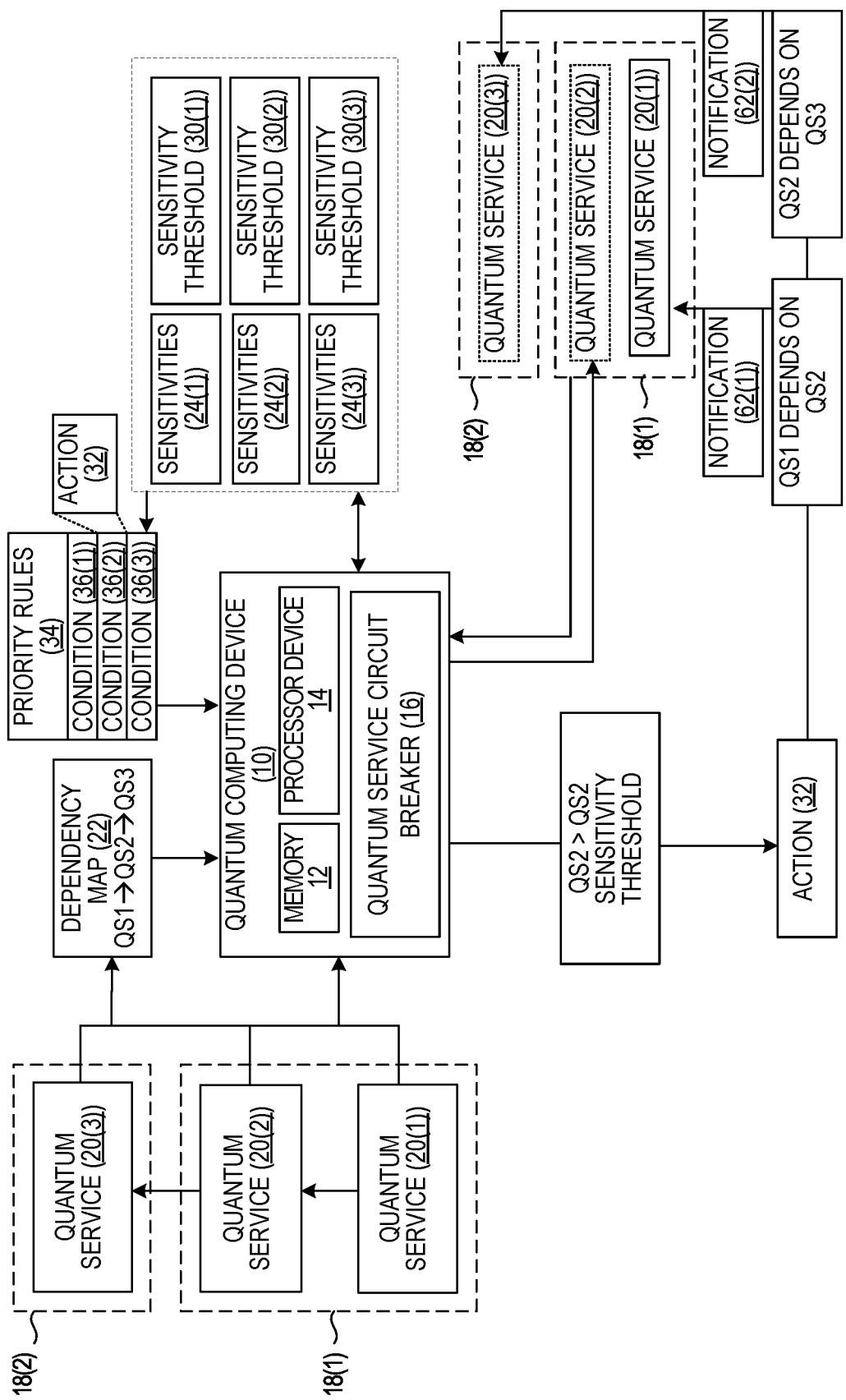
FIG. 5 is a block diagram of the quantum computing device of FIG. 1 for stopping cascading failures of quantum services, according to another example.

FIG. 5 is a block diagram of the quantum computing device 10 of FIG. 1 for stopping cascading failures of quantum services, according to one example. Elements of FIG. 1 are referenced in describing FIG. 5 for the sake of clarity. In the example of FIG. 5, the action 32 that the quantum service circuit breaker 16 can initiate may be to notify dependent quantum services of an interruption in the quantum service and to pause the quantum service. The quantum service circuit breaker 16 may determine quantum services from among the plurality of quantum services (e.g., 20(1), 20(2), 20(3)) that are dependent on the quantum service based on the dependency map 22. The quantum service circuit breaker 16 may notify the quantum services that are dependent on the quantum service of an interruption in the quantum service. For example, the second quantum service 20(2) may exceed the second computing resource sensitivity threshold 30(2) and the dependency map 22 may indicate that the first quantum service 20(1) depends on the second quantum service 20(2). The quantum service circuit breaker 16 may determine that the first quantum service 20(1) is dependent on the second quantum service 20(2) based on the dependency map 22. The quantum service circuit breaker 16 can send a notification 62(1) to the first quantum service 20(1) about an interruption in the second quantum service 20(2). The notification 62(1) may indicate that the first quantum service 20(1) may reroute API calls from the second quantum service 20(2) to another quantum service in the same quantum computing system or a different quantum computing system as the first quantum service 20(1) or the second quantum service 20(2).

The quantum service circuit breaker 16 may determine quantum services from among the plurality of quantum services (e.g., 20(1), 20(2), 20(3)) that the quantum service is dependent on. The quantum service circuit breaker 16 may notify the quantum service that the quantum service is dependent on of an interruption in the quantum service. For example, the second quantum service 20(2) may exceed the second computing resource sensitivity threshold 30(2) and the dependency map 22 may indicate that the second quantum service 20(2) depends on the third quantum service 20(3). The quantum service circuit breaker 16 may determine that the second quantum service 20(2) is dependent on the third quantum service 20(3) based on the dependency map 22. The quantum service circuit breaker 16 can send a notification 62(2) to the third quantum service 20(3) about an interruption in the second quantum service 20(2).

The quantum service circuit breaker 16 can the pause the quantum service, such as the second quantum service 20(2). In another example, the quantum service circuit breaker 16 may take the quantum service offline until the quantum service or the quantum computing system (e.g., 18(1), 18(2)) that the quantum service executes on is more stable, such as keeping the quantum service offline until the heat of the quantum computing system decreases or the noise level of the quantum computing system decreases. While the quantum service is paused or offline, the quantum services that depend on the quantum service may drop requests to the quantum service and request from other services in the same quantum computing system or a different quantum computing system. For example, the second quantum service 20(2) may be paused and the first quantum service 20(1) may depend on the second quantum service 20(2), so the first quantum service 20(1) can drop requests to the second quantum service 20(2) and request another quantum service (e.g., 20(3)) while the second quantum service 20(2) is paused.

Subsequent to pausing the quantum service, the quantum service circuit breaker 16 may monitor one or more of a stability of the one or more quantum computing systems (e.g., 18(1), 18(2)) where the quantum service was executing, a stability of the quantum service, and a stability of the other quantum services from among the plurality of quantum services (e.g., 20(1), 20(2), 20(3)). For example, the second quantum service 20(2), executing on the first quantum computing system 18(1), may exceed the second computing resource sensitivity threshold 30(2). After pausing the second quantum service 20(2), the quantum service circuit breaker 16 may monitor the stability of the first quantum computing system 18(1). For example, if the computing resource metric of the first quantum computing system 18(1) comprises the heat profile 40 of the first quantum computing system 18(1) and corresponds to the second computing resource sensitivities threshold 30(2), then the quantum service circuit breaker 16 may monitor the heat profile of the first quantum computing system 18(1). The quantum service circuit breaker 16 may determine that the one or more quantum computing systems (e.g., 18(1), 18(2)) stabilized and execute the quantum service on the one or more quantum computing systems (e.g., 18(1), 18(2)). For example, the first quantum computing system 18(1) may stabilize when the heat profile 40 of the first quantum computing system 18(1) decreases to a level below the second computing resource sensitivity threshold 30(2), and the quantum service circuit breaker 16 may determine that the heat profile 40 of the first quantum computing system 18(1) is below the second computing resource sensitivity threshold 30(2). The quantum service circuit breaker 16 may then execute the second quantum service 20(2) on the first quantum computing system 18(1). The quantum service circuit breaker 16 may monitor levels of computing resources of the one or more quantum computing systems (e.g., 18(1), 18(2)) or quantum services (e.g., 20(1), 20(2), 20(3)) and determine that the levels of computing resources are below a threshold indicating that the one or more quantum systems or quantum services is unstable. For example, the first quantum computing system 18(1) may stabilize when the heat profile 40 of the first quantum computing system 18(1) decreases to a level below the second computing resource sensitivity threshold 30(2), and the quantum service circuit breaker 16 may determine that the heat profile 40 of the first quantum computing system 18(1) is at or above the second computing resource sensitivity threshold 30(2). The quantum service circuit breaker 16 may then pause or continue to pause the second quantum service 20(2).

Figure 6:
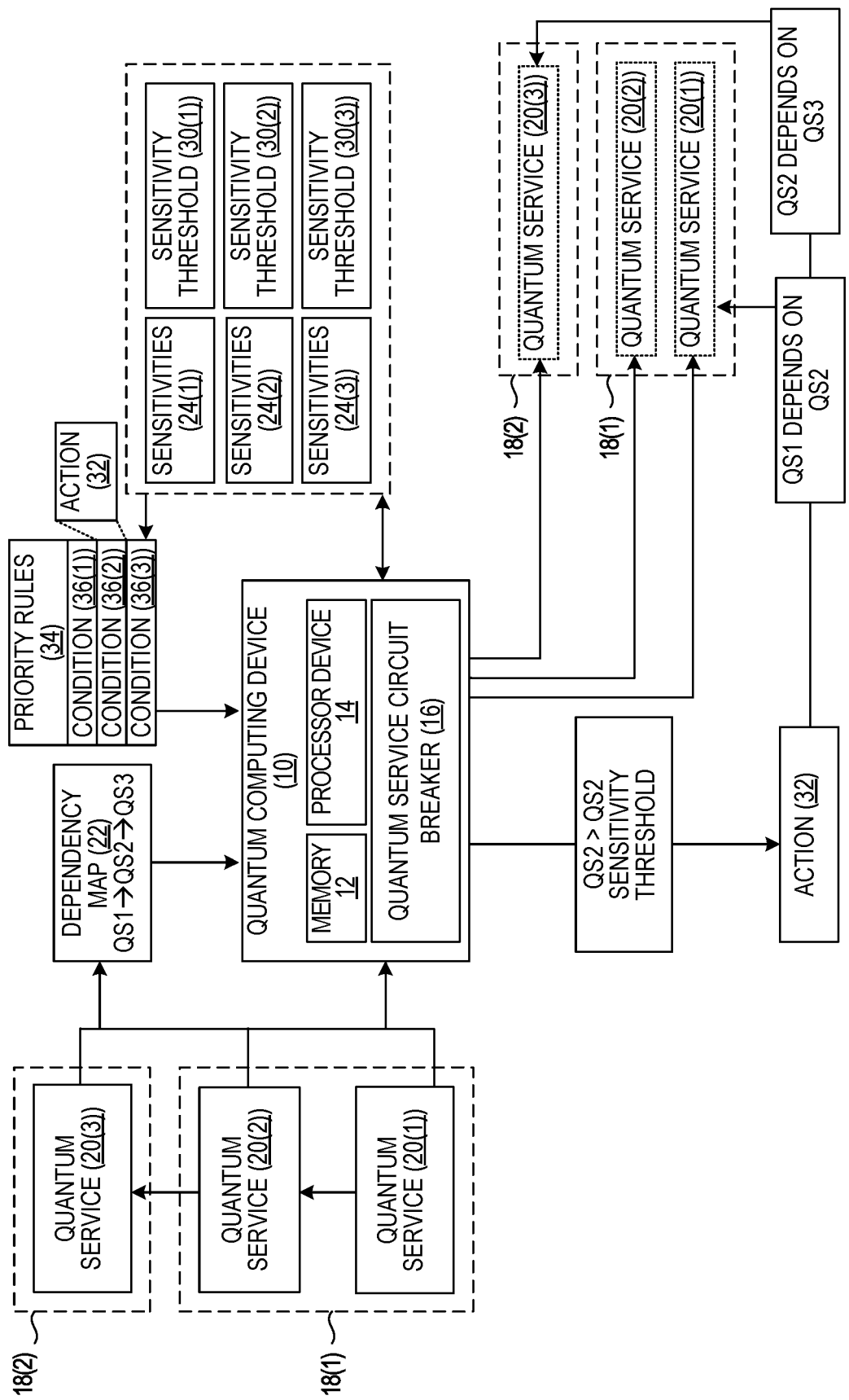
FIG. 6 is a block diagram of the quantum computing device of FIG. 1 for stopping cascading failures of quantum services, according to another example.

FIG. 6 is a block diagram of the quantum computing device 10 of FIG. 1 for stopping cascading failures of quantum services, according to one example. Elements of FIG. 1 are referenced in describing FIG. 6 for the sake of clarity. In the example of FIG. 6, the action 32 that the quantum service circuit breaker 16 can initiate may be to pause dependent quantum services and terminate the quantum service. The quantum service circuit breaker 16 may determine one or more quantum services from among the plurality of quantum services (e.g., 20(1), 20(2), 20(3)) that are dependent on the quantum service based on the dependency map 22. The quantum service circuit breaker 16 may pause the one or more quantum services that are dependent on the quantum service. For example, the second quantum service 20(2) may exceed the second computing resource sensitivity threshold 30(2) and the dependency map 22 may indicate that the first quantum service 20(1) depends on the second quantum service 20(2). The quantum service circuit breaker 16 may determine that the first quantum service 20(1) is dependent on the second quantum service 20(2), based on the dependency map 22, and pause the first quantum service 20(1) and terminate the second quantum service 20(2). Subsequent to pausing the one or more quantum services (e.g., 20(1), 20(2), 20(3)) that are dependent on the quantum service, the quantum service circuit breaker 16 may terminate the one or more quantum services that are dependent on the quantum service. For example, after pausing the first quantum service 20(1), the quantum service circuit breaker 16 may terminate the first quantum service 20(1).

The quantum service circuit breaker 16 may determine one or more quantum services from among the plurality of quantum services (e.g., 20(1), 20(2), 20(3)) that the quantum service is dependent on based on the dependency map 22. The quantum service circuit breaker 16 can pause the one or more quantum services that the quantum service is dependent on and terminate the quantum service. For example, the second quantum service 20(2) may exceed the second computing resource sensitivity threshold 30(2) and the dependency map 22 may indicate that the second quantum service 20(2) depends on the third quantum service 20(3). The quantum service circuit breaker 16 may determine that the second quantum service 20(2) is dependent on the third quantum service 20(3) based on the dependency map 22. The quantum service circuit breaker 16 can pause the third quantum service 20(3) and terminate the second quantum service 20(2). Subsequent to pausing the one or more quantum services (e.g., 20(1), 20(2), 20(3)) that the quantum service is dependent on, the quantum service circuit breaker 16 may terminate the one or more quantum services that the quantum service is dependent on. For example, after pausing the third quantum service 20(3), the quantum service circuit breaker 16 may terminate the third quantum service 20(3).

Figure 7:
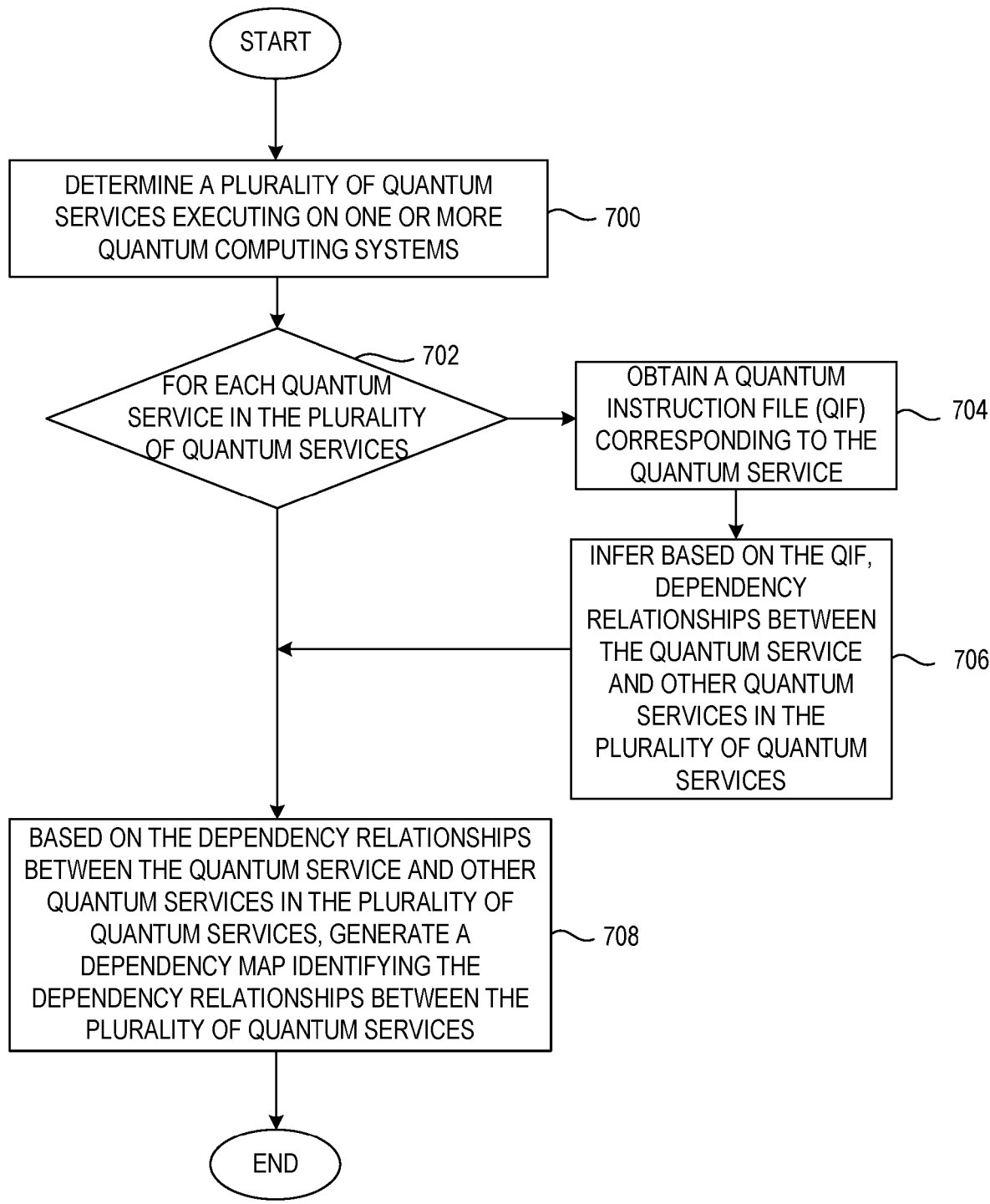
FIG. 7 is a flowchart illustrating operations performed by the quantum computing device of FIG. 1 for stopping cascading failures of quantum services, according to another example.

FIG. 7 is a flowchart illustrating operations performed by the quantum computing device 10 of FIG. 1 for stopping cascading failures of quantum services, according to one example. Elements of FIG. 1 are referenced in describing FIG. 7 for the sake of clarity. In FIG. 7, operations begin with a processor device of a quantum computing device, such as the processor device 14 of the quantum computing device 10 of FIG. 1, determining a plurality of quantum services (e.g., 20(1), 20(2), 20(3)) executing on one or more quantum computing systems (e.g., 18(1), 18(2)) (block 700). For each quantum service in the plurality of quantum services (e.g., 20(1), 20(2), 20(3)) (block 702), the processor device 14 then obtains a quantum instruction file (e.g., 26(1), 26(2), 26(3)) corresponding to the quantum service (block 704) and then infers based on the quantum instruction file (e.g., 26(1), 26(2), 26(3)), dependency relationships between the quantum service and other quantum services in the plurality of quantum services (e.g., 20(1), 20(2), 20(3)) (block 706). The processor device 14 then based on the dependency relationships between the quantum service and other quantum services in the plurality of quantum services (e.g., 20(1), 20(2), 20(3)), generates a dependency map 22 identifying the dependency relationships between the plurality of quantum services (e.g., 20(1), 20(2), 20(3)) (block 708).

Figure 8:
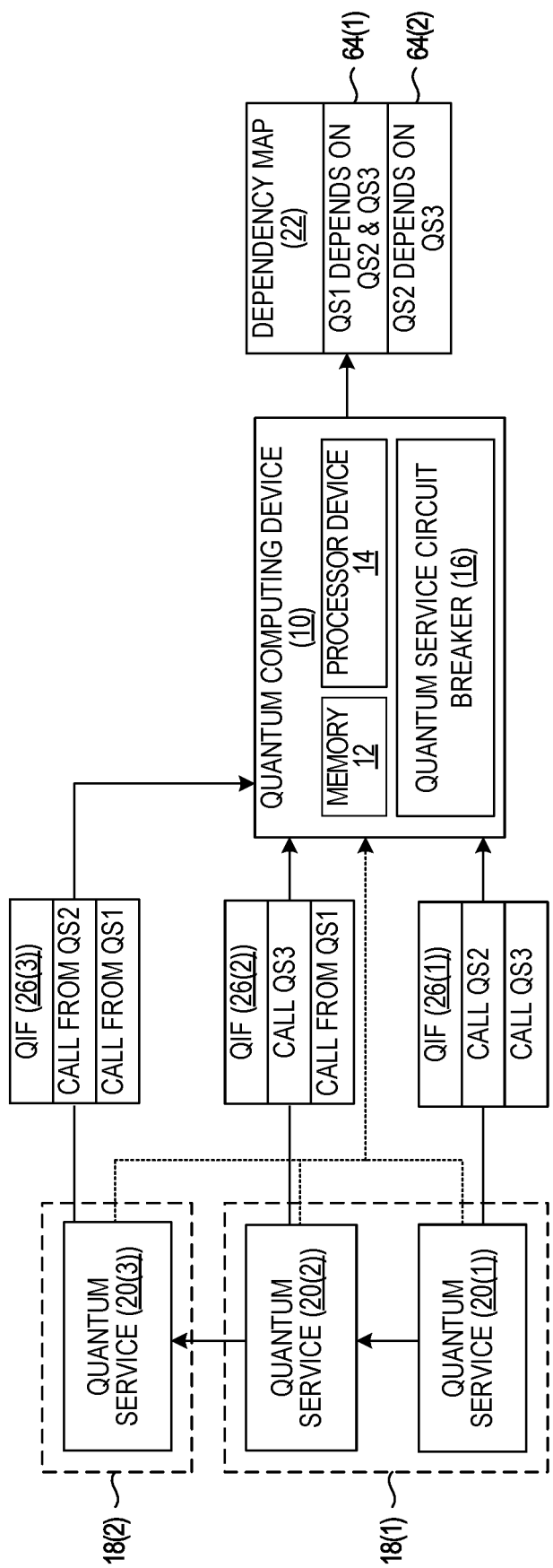
FIG. 8 is a block diagram of the quantum computing device of FIG. 1 for stopping cascading failures of quantum services, according to another example.

FIG. 8 is a block diagram of the quantum computing device 10 of FIG. 1 for stopping cascading failures of quantum services, according to one example. Elements of FIG. 1 are referenced in describing FIG. 8 for the sake of clarity. In the example of FIG. 8, the quantum service circuit breaker 16 may determine a plurality of quantum services (e.g., 20(1), 20(2), 20(3)) executing on one or more quantum computing systems (e.g., 18(1), 18(2)). For example, the quantum service circuit breaker 16 may determine the first quantum service 20(1) executing on the first quantum computing system 18(1), the second quantum service 20(2) executing on the first quantum computing system 18(1), and the third quantum service 20(3) executing on the second quantum computing system 18(2).

For each quantum service in the plurality of quantum services (e.g., 20(1), 20(2), 20(3)), the quantum service circuit breaker 16 may obtain the quantum instruction file (e.g., 26(1), 26(2), 26(3)) that corresponds to the quantum service. For instance, the quantum service circuit breaker 16 may obtain the first quantum instruction file 26(1) that corresponds to the first quantum service 20(1), the second quantum instruction file 26(2) that corresponds to the second quantum service 20(2), and the third quantum instruction file 26(3) that corresponds to the third quantum service 20(3). The quantum instruction file (e.g., 26(1), 26(2), 26(3)) may be a QASM file or any other component that contains a list of instructions that can be executed on a quantum computing device (e.g., 10) in a quantum computing system (e.g., 18(1), 18(2)). The quantum service circuit breaker 16 may access the QASM repository to obtain a QASM file that corresponds to the quantum service.

For each quantum service in the plurality of quantum services (e.g., 20(1), 20(2), 20(3)), the quantum service circuit breaker 16 may infer dependency relationships between the quantum service and other quantum services in the plurality of quantum services based on the quantum instruction file (e.g., 26(1), 26(2), 26(3)). The dependency relationships between the quantum service and other quantum services in the plurality of quantum services (e.g., 20(1), 20(2), 20(3)) may include dependencies between quantum services that execute in the same quantum computing system (e.g., 18(1), 18(2)). For instance, the first quantum service 20(1) in the first quantum computing system 18(1) may have a dependency on the second quantum service 20(2) in the first quantum computing system 18(1). The dependency relationships between the quantum service and other quantum services in the plurality of quantum services (e.g., 20(1), 20(2), 20(3)) may include dependencies between quantum services that execute in different quantum computing systems (e.g., 18(1), 18(2)). For instance, the first quantum service 20(1) in the first quantum computing system 18(1)

may have a dependency on the third quantum service 20(3) in the second quantum computing system 18(2).

The quantum service circuit breaker 16 may infer the dependency relationships between the quantum service and other quantum services by reading the quantum instruction file (e.g., 26(1), 26(2), 26(3)) that corresponds to the quantum service and determining that the quantum instruction file has a call (e.g., an API call, as a non-limiting example) to another quantum service from among the plurality of quantum services (e.g., 20(1), 20(2), 20(3)). Based on the call in the quantum instruction file, the quantum service circuit breaker 16 can infer that the quantum service depends on the quantum service that is called. For example, the first quantum instruction file 26(1) corresponding to the first quantum service 20(1) may have a call to the second quantum service 20(2) and a call to the third quantum service 20(3). The quantum service circuit breaker 16 may infer that the first quantum service 20(1) depends on the second quantum service 20(2) and the third quantum service 20(3) based on the calls to the second quantum service 20(2) and the third quantum service 20(3), respectively, in the first quantum instruction file 26(1). The quantum service circuit breaker 16 may infer the dependency relationships between the quantum service and other quantum services by reading the quantum instruction file (e.g., 26(1), 26(2), 26(3)) that corresponds to the quantum service and determining that the quantum instruction file has a call from another quantum service from among the plurality of quantum services (e.g., 20(1), 20(2), 20(3)). Based on the call in the quantum instruction file, the quantum service circuit breaker 16 can infer that the quantum service that the call is from depends on the quantum service. For example, the second quantum instruction file 26(2) corresponding to the second quantum service 20(2) may have a call from the first quantum service 20(1) and a call to the third quantum service 20(3). The quantum service circuit breaker 16 may infer that the first quantum service 20(1) depends on the second quantum service 20(2) and that the second quantum service 20(2) depends on the third quantum service 20(3). The quantum service circuit breaker 16 may infer the dependency relationships between the quantum service and other quantum services by reading the quantum instruction file (e.g., 26(1), 26(2), 26(3)) that corresponds to the quantum service and determining that the quantum instruction file has no call to another quantum service from among the plurality of quantum services (e.g., 20(1), 20(2), 20(3)). Based on the quantum instruction file, the quantum service circuit breaker 16 can infer that the quantum service does not depend on the quantum service that is not called. For example, the third quantum instruction file 26(3) corresponding to the third quantum service 20(3) may have a call from the first quantum service 20(1) and the second quantum service 20(2) and no calls to another quantum service. The quantum service circuit breaker 16 may infer that the third quantum service 20(3) is not dependent on another quantum service. The quantum service circuit breaker 16 may infer the dependency relationships between the quantum service and other quantum services by reading the quantum instruction file (e.g., 26(1), 26(2), 26(3)) that corresponds to the quantum service and determining that there is no call from any other quantum service from among the plurality of quantum services (e.g., 20(1), 20(2), 20(3)). Based on the quantum instruction file, the quantum service circuit breaker 16 can infer that no quantum service is dependent on the quantum service. For example, the first quantum instruction file 26(1) corresponding to the first quantum service 20(1) may not have a call from any quantum service. The quantum service circuit breaker 16 may infer that no quantum service is dependent on the first quantum service 20(1).

The quantum service circuit breaker 16 may generate a dependency map 22 that identifies the dependency relationships between the plurality of quantum services (e.g., 20(1), 20(2), 20(3)) based on the dependency relationships between the quantum service and other quantum services in the plurality of quantum services. For instance, the dependency relationships may be a first dependency relationship 64(1) that indicates that the first quantum service 20(1) depends on the second quantum service 20(2) and the third quantum service 20(3), and a second dependency relationship 64(2) that indicates that the second quantum service 20(2) depends on the third quantum service 20(3). The dependency relationships (e.g., 64(1), 64(2)) may comprise records in the dependency map 22 for the quantum service circuit breaker 16 to access in order to identify the dependency relationships between the plurality of quantum services (e.g., 20(1), 20(2), 20(3)).

Figure 9:
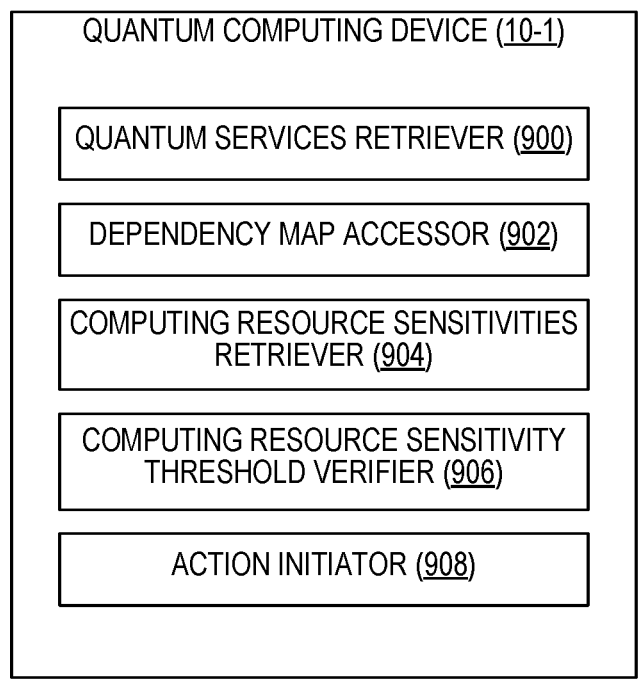
FIG. 9 is a block diagram of a quantum computing device suitable for implementing aspects illustrated in FIGS. 1-8 according to another example.

FIG. 9 is a block diagram of a quantum computing device 10-1 according to another implementation. The quantum computing device 10-1 implements identical functionality as that described above with regard to the quantum computing device 10. The quantum computing device 10-1 includes a quantum services retriever 900 to determine a plurality of quantum services executing on one or more quantum computing systems. The quantum services retriever 900 may comprise executable software instructions configured to program a processor device to implement the functionality of determining a plurality of quantum services executing on one or more quantum computing systems, may comprise circuitry including, by way of non-limiting example, an application-specific integrated circuit (ASIC), field-programmable gate array (FPGA), or may comprise a combination of executable software instructions and circuitry.

The quantum computing device 10-1 also includes a dependency map accessor 902 to access a dependency map identifying dependency relationships between the plurality of quantum services. The dependency map accessor 902 may comprise executable software instructions configured to program a processor device to implement the functionality of accessing a dependency map identifying dependency relationships between the plurality of quantum services, may comprise circuitry including, by way of non-limiting example, an ASIC, FPGA, or may comprise a combination of executable software instructions and circuitry.

The quantum computing device 10-1 also includes a computing resources sensitivities retriever 904 to determine computing resource sensitivities for at least some quantum services of the plurality of quantum services. In some implementations, the computing resources sensitivities retriever 904 determines the computing resource sensitivities by, for each quantum service in the at least quantum services, obtaining a quantum instruction file corresponding to the quantum service and reading annotations in the quantum instruction file that indicate levels of computing resources at a time when a decrease in performance of the quantum service occurs. The computing resources sensitivities retriever 904 may comprise executable software instructions configured to program a processor device to implement the functionality of determining computing resource sensitivities for at least some quantum services of the plurality of quantum services, may comprise circuitry including, by way of non-limiting example, an ASIC, FPGA, or may comprise a combination of executable software instructions and circuitry.

The quantum computing device 10-1 also includes a computing resources sensitivity threshold verifier 906 to determine, based on the computing resource sensitivities for a quantum service from among the plurality of quantum services, that the quantum service exceeds a computing resource sensitivity threshold for the quantum service. In some implementations, the computing resources sensitivity threshold verifier 906 determines that the quantum service exceeds a computing resource sensitivity threshold for the quantum service by monitoring computing resource metrics of the quantum computing systems and the quantum services, obtaining a quantum instruction file corresponding to the quantum service, determining an annotation in the quantum instruction file that identifies a level of a computing resource associated with a decrease in performance of the quantum service, and determining that the computing resource metric matches the level of the computing resource based on the annotation. The computing resources sensitivity threshold verifier 906 may comprise executable software instructions configured to program a processor device to implement the functionality of determining that the quantum service exceeds a computing resource sensitivity threshold for the quantum service, may comprise circuitry including, by way of non-limiting example, an ASIC, FPGA, or may comprise a combination of executable software instructions and circuitry.

The quantum computing device 10-1 also includes an action initiator 908 to, in response to determine that the quantum service exceeds the computing resource sensitivity threshold, initiate, based on priority rules, an action. In some implementations, the action initiator 908 initiates the action by determining the dependency relationships of the quantum services based on the dependency map, initiating a copy of the quantum service, directing the quantum services that are dependent on the quantum service to use the copy of the quantum service, and terminating the quantum service. In some implementations, the action initiator 908 initiates the action by determining the dependency relationships of the quantum services based on the dependency map, notifying the quantum services that are dependent on the quantum service of an interruption in the quantum service, notifying the quantum services that the quantum service is dependent on of an interruption in the quantum service, and pausing the quantum service. In some implementations, the action initiator 908 initiates the action by determining the dependency relationships of the quantum services based on the dependency map, pausing the quantum services that are dependent on the quantum service, pausing the quantum services that the quantum service is dependent on, and terminating the quantum service. The action initiator 908 may comprise executable software instructions configured to program a processor device to implement the functionality of initiating an action, may comprise circuitry including, by way of non-limiting example, an ASIC, FPGA, or may comprise a combination of executable software instructions and circuitry.

Figure 10:
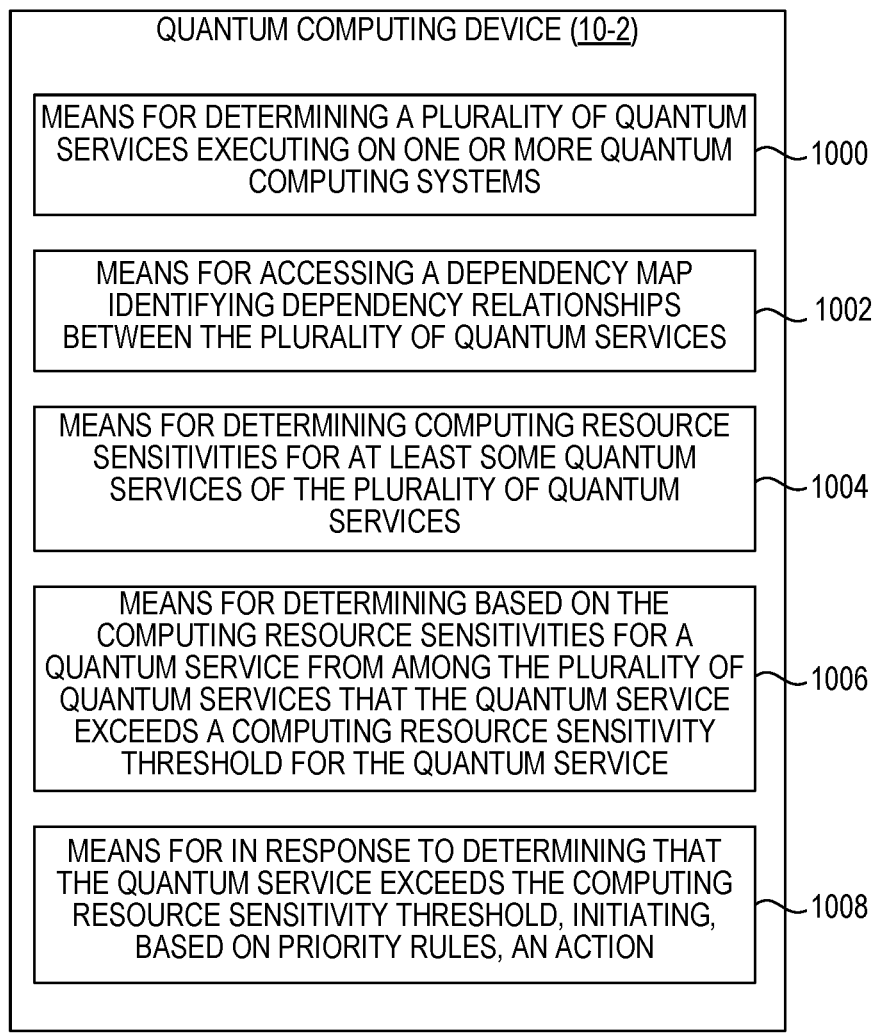
FIG. 10 is a block diagram of the quantum computing device of FIG. 1 for stopping cascading failures of quantum services, according to another example.

FIG. 10 is a block diagram of a quantum computing device 10-2 according to additional implementations. The quantum computing device 10-2 implements identical functionality as that described above with regard to the quantum computing device 10. In this implementation, the quantum computing device 10-2 includes a means 1000 for determining a plurality of quantum services executing on one or more quantum computing systems. The means 1000 may be implemented in any number of manners, including, for example via the quantum services retriever 900 illustrated in FIG. 9.

The quantum computing device 10-2 also includes a means 1002 for accessing a dependency map identifying dependency relationships between the plurality of quantum services. The means 1000 may be implemented in any number of manners, including, for example via the dependency map accessor 902 illustrated in FIG. 9.

The quantum computing device 10-2 also includes a means 1004 for determining computing resource sensitivities for at least some quantum services of the plurality of quantum services. The means 1004 may, in some implementations, for each quantum service in the at least quantum services, obtain a quantum instruction file corresponding to the quantum service and read annotations in the quantum instruction file that indicate levels of computing resources at a time when a decrease in performance of the quantum service occurs. The means 1004 may be implemented in any number of manners, including, for example via the computing resource sensitivities retriever 904 illustrated in FIG. 9.

The quantum computing device 10-2 also includes a means 1006 for determining, based on the computing resource sensitivities for a quantum service from among the plurality of quantum services, that the quantum service exceeds a computing resource sensitivity threshold for the quantum service. The means 1006 may, in some implementations, monitor computing resource metrics of the quantum computing systems and the quantum services, obtain a quantum instruction file corresponding to the quantum service, determine an annotation in the quantum instruction file that identifies a level of a computing resource associated with a decrease in performance of the quantum service, and determine that the computing resource metric matches the level of the computing resource based on the annotation. The means 1006 may be implemented in any number of manners, including, for example via the computing resource sensitivity threshold verifier 906 illustrated in FIG. 9.

The quantum computing device 10-2 also includes a means 1008 for in response to determining that the quantum service exceeds the computing resource sensitivity threshold, initiating, based on priority rules, an action. The means 1008 may, in some implementations, determine the dependency relationships of the quantum services based on the dependency map, initiate a copy of the quantum service, direct the quantum services that are dependent on the quantum service to use the copy of the quantum service, and terminate the quantum service. The means 1008 may, in some implementations, determine the dependency relationships of the quantum services based on the dependency map, notify the quantum services that are dependent on the quantum service of an interruption in the quantum service, notify the quantum services that the quantum service is dependent on of an interruption in the quantum service, and pause the quantum service. The means 1008 may, in some implementations, determine the dependency relationships of the quantum services based on the dependency map, pause the quantum services that are dependent on the quantum service, pause the quantum services that the quantum service is dependent on, and terminate the quantum service. The means 1008 may be implemented in any number of manners, including, for example via the action initiator 908 illustrated in FIG. 9.

Figure 11:
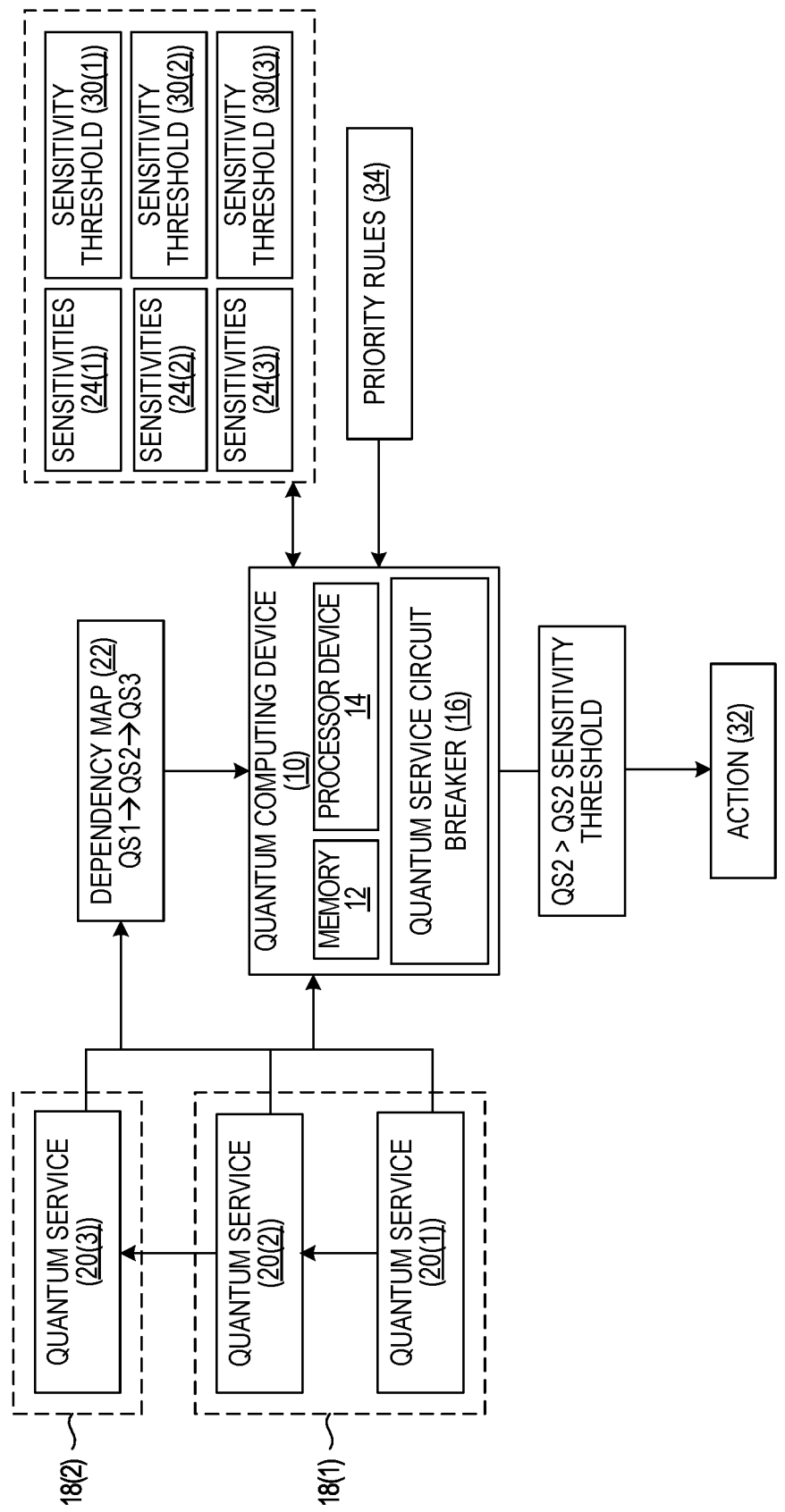
FIG. 11 is a block diagram of the quantum computing device of FIG. 1 for stopping cascading failures of quantum services, according to another example.

FIG. 11 is a block diagram of the quantum computing device 10 of FIG. 1 for stopping cascading failures of quantum services, according to one example. Elements of FIG. 1 are referenced in describing FIG. 11 for the sake of clarity. In the example of FIG. 11, a quantum computing device 10 comprises a memory 12 and a processor device 14 coupled to the memory 12. The processor device 14 is to determine a plurality of quantum services (e.g., 20(1), 20(2), 20(3)) executing on one or more quantum computing systems (e.g., 18(1), 18(2)). The processor device 14 is further to access a dependency map 22 identifying dependency relationships between the plurality of quantum services (e.g., 20(1), 20(2), 20(3)). The processor device 14 is further to determine computing resource sensitivities (e.g., 24(1), 24(2), 24(3)) for at least some quantum services of the plurality of quantum services (e.g., 20(1), 20(2), 20(3)). The processor device 14 is further to determine, based on the computing resource sensitivities (e.g., 24(1), 24(2), 24(3)) for a quantum service from among the plurality of quantum services (e.g., 20(1), 20(2), 20(3)), that the quantum service exceeds a computing resource sensitivity threshold (e.g., 30(1), 30(2), 30(3)) for the quantum service. The processor device 14 is further to in response to determine that the quantum service exceeds the computing resource sensitivity threshold (e.g., 30(1), 30(2), 30(3)), initiate, based on priority rules 34, an action 32.

Figure 12:
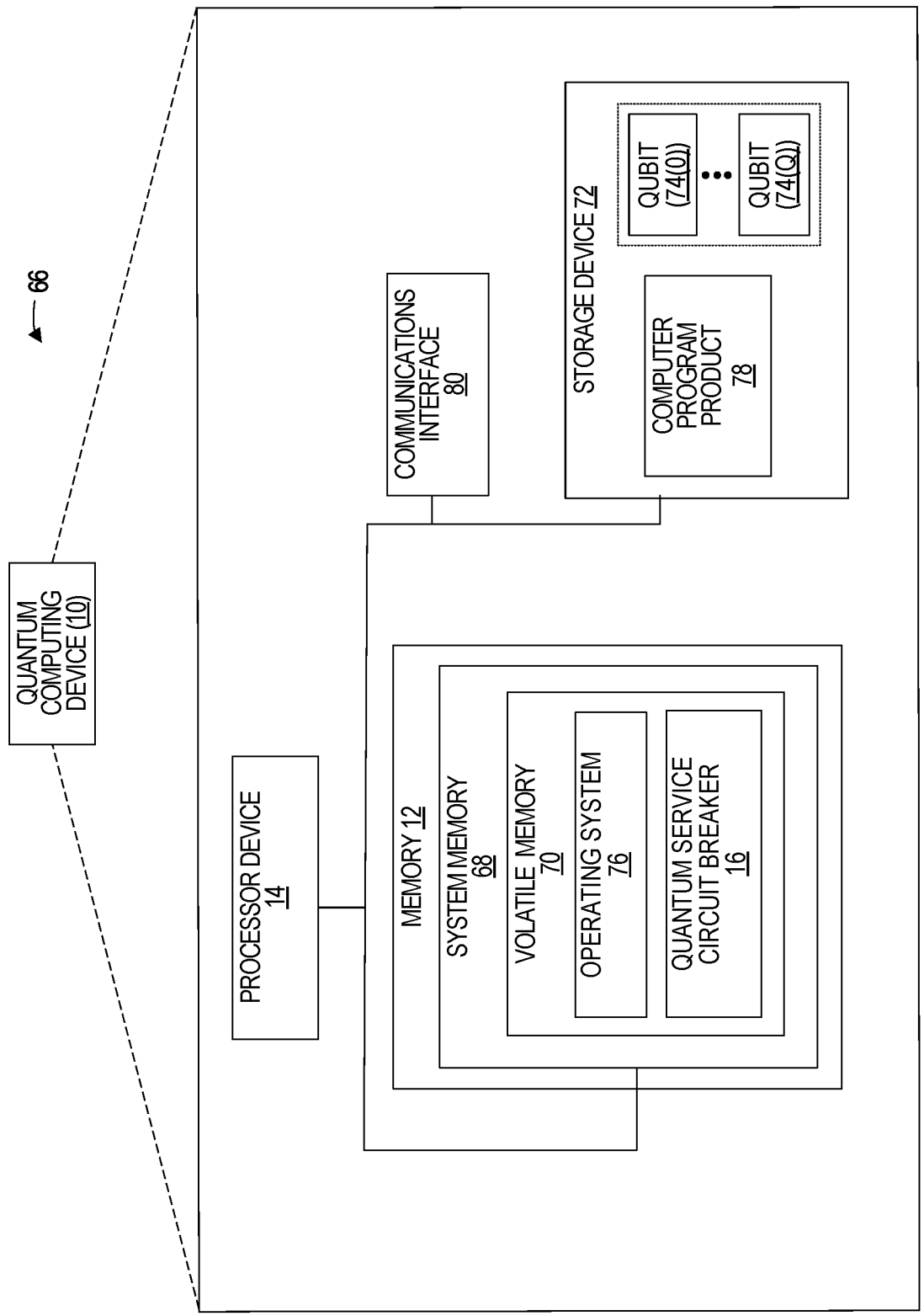
FIG. 12 is a block diagram of a quantum computing device suitable for implementing examples, according to one example.

FIG. 12 is a block diagram of a quantum computing device 66, such as the quantum computing device 10 of FIG. 1, suitable for implementing examples according to one example. The quantum computing device 66 may comprise any suitable quantum computing device or devices. The quantum computing device 66 can operate using classical computing principles or quantum computing principles. Thus, in some implementations, portions of the quantum computing device 66 (e.g., the quantum service circuit breaker 16) may be executed using classical computing components and/or algorithms. When using quantum computing principles, the quantum computing device 66 performs computations that utilize quantum-mechanical phenomena, such as superposition and entanglement. The quantum computing device 66 may operate under certain environmental conditions, such as at or near zero degrees (0°) Kelvin. When using classical computing principles, the quantum computing device 84 utilizes binary digits that have a value of either zero (0) or one (1).

The quantum computing device 66 includes a processor device 14 and a memory 12. The processor device 14 can be any commercially available or proprietary processor suitable for operating in a quantum environment. The memory 12 may include system memory 68. The system memory 68 may include volatile memory 70 (e.g., random-access memory (RAM)).

The quantum computing device 66 may further include or be coupled to a non-transitory computer-readable medium such as a storage device 72. The storage device 72 may comprise, for example, an internal or external hard disk drive (HDD) (e.g., enhanced integrated drive electronics (EIDE) or serial advanced technology attachment (SATA)) for storage, memory, or the like. The storage device 72 and other drives associated with computer-readable media and computer-usable media may provide non-volatile storage of data, data structures, computer-executable instructions, and the like. The storage device may also provide functionality for storing one or more qubits 74(0)-74(Q).

A number of modules can be stored in the storage device 72 and in the volatile memory 70, including an operating system 76 and one or more modules, such as the quantum service circuit breaker 16. All or a portion of the examples may be implemented as a computer program product 78 stored on a transitory or non-transitory computer-usable or computer-readable medium, such as the storage device 72, which includes complex programming instructions, such as complex computer-readable program code, to cause the processor device 14 to carry out the steps described herein. Thus, the computer-readable program code can comprise computer-executable instructions for implementing the functionality of the examples described herein when executed on the processor device 14.

An operator may also be able to enter one or more configuration commands through a keyboard (not illustrated), a pointing device such as a mouse (not illustrated), or a touch-sensitive surface such as a display device (not illustrated). The quantum computing device 66 may also include a communications interface 80 suitable for communicating with other quantum computing systems, including, in some implementations, classical computing devices.

Other computer system designs and configurations may also be suitable to implement the systems and methods described herein. The following examples illustrate various implementations in accordance with one or more aspects of the disclosure.

Example 1 is a method comprising determining, by a quantum computing device, a plurality of quantum services executing on one or more quantum computing systems; for each quantum service in the plurality of quantum services: obtaining, by the quantum computing device, a quantum instruction file (QIF) corresponding to the quantum service; and inferring, by the quantum computing device based on the QIF, dependency relationships between the quantum service and other quantum services in the plurality of quantum services; and based on the dependency relationships between the quantum service and other quantum services in the plurality of quantum services, generating, by the quantum computing device, a dependency map identifying the dependency relationships between the plurality of quantum services.

Example 2 is the method of example 1 wherein inferring the dependency relationships between the quantum service and other quantum services in the plurality of quantum services comprises reading the QIF corresponding to the quantum service; determining, based on the QIF, that the quantum service has a call to another quantum service from among the plurality of quantum services; and inferring, based on the call to the other quantum service, that the quantum service depends on the other quantum service.

Example 3 is the method of example 1 wherein inferring the dependency relationships between the quantum service and other quantum services in the plurality of quantum services comprises reading the QIF corresponding to the quantum service; determining, based on the QIF, that another quantum service from among the plurality of quantum services has a call to the quantum service; and inferring, based on the call to the quantum service, that the other quantum service depends on the quantum service.

Example 4 is the method of example 1 wherein inferring the dependency relationships between the quantum service and other quantum services in the plurality of quantum services comprises reading the QIF corresponding to the quantum service; determining, based on the QIF, that the quantum service has no call to another quantum service from among the plurality of quantum services; and inferring that the quantum service is not dependent on another quantum service from among the plurality of quantum services.

Example 5 is the method of example 1 wherein inferring the dependency relationships between the quantum service and other quantum services in the plurality of quantum services comprises reading the QIF corresponding to the quantum service; determining, based on the QIF, that no other quantum service from among the plurality of quantum services has a call to the quantum service; and inferring that no other quantum service from among the plurality of quantum services is dependent on the quantum service.

Example 6 is the method of example 1 wherein the dependency relationships between the quantum service and other quantum services in the plurality of quantum services comprise dependency relationships between a quantum service in a first quantum computing system and a quantum service in a second quantum computing system.

Example 7 is a quantum computing device that includes a memory and a processor device coupled to the memory. The processor device is to determine a plurality of quantum services executing on one or more quantum computing systems; for each quantum service in the plurality of quantum services: obtain a quantum instruction file (QIF) corresponding to the quantum service; and infer based on the QIF, dependency relationships between the quantum service and other quantum services in the plurality of quantum services; and based on the dependency relationships between the quantum service and other quantum services in the plurality of quantum services, generate a dependency map identifying the dependency relationships between the plurality of quantum services.

Example 8 is the quantum computing device of example 7 wherein, to infer dependency relationships between the quantum service and other quantum services in the plurality of quantum services, the processor device is further to read the QIF corresponding to the quantum service; determine, based on the QIF, that the quantum service has a call to another quantum service from among the plurality of quantum services; and infer, based on the call to the other quantum service, that the quantum service depends on the other quantum service.

Example 9 is the quantum computing device of example 7 wherein, to infer dependency relationships between the quantum service and other quantum services in the plurality of quantum services, the processor device is further to read the QIF corresponding to the quantum service; determine, based on the QIF, that another quantum service from among the plurality of quantum services has a call to the quantum service; infer, based on the call to the quantum service, that the other quantum service depends on the quantum service.

Example 10 is the quantum computing device of example 7 wherein, to infer dependency relationships between the quantum service and other quantum services in the plurality of quantum services, the processor device is further to read the QIF corresponding to the quantum service; determine, based on the QIF, that the quantum service has no call to another quantum service from among the plurality of quantum services; and infer that the quantum service is not dependent on another quantum service from among the plurality of quantum services.

Example 11 is the quantum computing device of example 7 wherein, to infer dependency relationships between the quantum service and other quantum services in the plurality of quantum services, the processor device is further to read the QIF corresponding to the quantum service; determine, based on the QIF, that no other quantum service from among the plurality of quantum services has a call to the quantum service; and infer that no other quantum service from among the plurality of quantum services is dependent on the quantum service.

Example 12 is the quantum computing device of example 7 wherein the dependency relationships between the quantum service and other quantum services in the plurality of quantum services comprise dependency relationships between a quantum service in a first quantum computing system and a quantum service in a second quantum computing system.

Example 13 is a non-transitory computer-readable storage medium that includes computer-executable instructions that, when executed, cause one or more processor devices to determine a plurality of quantum services executing on one or more quantum computing systems; for each quantum service in the plurality of quantum services: obtain a quantum instruction file (QIF) corresponding to the quantum service; and infer based on the QIF, dependency relationships between the quantum service and other quantum services in the plurality of quantum services; and based on the dependency relationships between the quantum service and other quantum services in the plurality of quantum services, generate a dependency map identifying the dependency relationships between the plurality of quantum services.

Example 14 is the non-transitory computer-readable storage medium of example 13 wherein to infer dependency relationships between the quantum service and other quantum services in the plurality of quantum services, the instructions are further to cause the processor device to read the QIF corresponding to the quantum service; determine, based on the QIF, that the quantum service has a call to another quantum service from among the plurality of quantum services; and infer, based on the call to the other quantum service, that the quantum service depends on the other quantum service.

Example 15 is the non-transitory computer-readable storage medium of example 13 wherein to infer dependency relationships between the quantum service and other quantum services in the plurality of quantum services, the instructions are further to cause the processor device to read the QIF corresponding to the quantum service; determine, based on the QIF, that another quantum service from among the plurality of quantum services has a call to the quantum service; infer, based on the call to the quantum service, that the other quantum service depends on the quantum service.

Example 16 is the non-transitory computer-readable storage medium of example 13 wherein to infer dependency relationships between the quantum service and other quantum services in the plurality of quantum services, the instructions are further to cause the processor device to read the QIF corresponding to the quantum service; determine, based on the QIF, that the quantum service has no call to another quantum service from among the plurality of quantum services; and infer that the quantum service is not dependent on another quantum service from among the plurality of quantum services.

Example 17 is the non-transitory computer-readable storage medium of example 13 wherein to infer dependency relationships between the quantum service and other quantum services in the plurality of quantum services, the instructions are further to cause the processor device to read the QIF corresponding to the quantum service; determine, based on the QIF, that no other quantum service from among the plurality of quantum services has a call to the quantum service; and infer that no other quantum service from among the plurality of quantum services is dependent on the quantum service.

Example 18 is the non-transitory computer-readable storage medium of example 13 wherein the dependency relationships between the quantum service and other quantum services in the plurality of quantum services comprise dependency relationships between a quantum service in a first quantum computing system and a quantum service in a second quantum computing system.

Example 19 is a quantum computing device that includes a quantum services retriever to determine a plurality of quantum services executing on one or more quantum computing systems; a dependency map accessor to access a dependency map identifying dependency relationships between the plurality of quantum services; a computing resource sensitivities retriever to determine computing resource sensitivities for at least some quantum services of the plurality of quantum services; a computing resource sensitivity threshold verifier to determine, based on the computing resource sensitivities for a quantum service from among the plurality of quantum services, that the quantum service exceeds a computing resource sensitivity threshold for the quantum service; and an action initiator to, in response to determine that the quantum service exceeds the computing resource sensitivity threshold, initiate, based on priority rules, an action.

Example 20 is a quantum computing device that includes a means for determining a plurality of quantum services executing on one or more quantum computing systems; a means for accessing a dependency map identifying dependency relationships between the plurality of quantum services; a means for determining computing resource sensitivities for at least some quantum services of the plurality of quantum services; a means for determining, based on the computing resource sensitivities for a quantum service from among the plurality of quantum services, that the quantum service exceeds a computing resource sensitivity threshold for the quantum service; and a means for in response to determining that the quantum service exceeds the computing resource sensitivity threshold, initiating, based on priority rules, an action.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a quantum computing device, a plurality of quantum services executing on one or more quantum computing systems;
   accessing, by the quantum computing device, a dependency map identifying dependency relationships comprising at least one of a dependent upstream relationship or a dependent downstream relationship between the plurality of quantum services;
   determining, by the quantum computing device, computing resource sensitivities for at least some quantum services of the plurality of quantum services;
   determining, by the quantum computing device based on the computing resource sensitivities for a quantum service from among the plurality of quantum services, that the quantum service exceeds a computing resource sensitivity threshold for the quantum service; and
   in response to determining that the quantum service exceeds the computing resource sensitivity threshold, initiating, by the quantum computing device based on priority rules specifying an action to stabilize the plurality of quantum services, the action to stabilize the plurality of quantum services.

2. The method of claim 1, wherein determining the computing resource sensitivities for at least some quantum services of the plurality of quantum services comprises:
   for each quantum service in the at least some quantum services:
      obtaining a Quantum Instruction File (QIF) corresponding to the quantum service; and
      reading annotations in the QIF indicating levels of computing resources at a time when a decrease in performance of the quantum service occurs.

3. The method of claim 1, wherein determining that the quantum service exceeds a computing resource sensitivity threshold for the quantum service comprises:
   monitoring a computing resource metric of the one or more quantum computing systems and the plurality of quantum services executing on the one or more quantum computing systems;
   obtaining a QIF corresponding to the quantum service;
   determining an annotation in the QIF that identifies a level of a computing resource associated with a decrease in performance of the quantum service; and
   determining, based on the annotation in the QIF, that the computing resource metric matches the level of the computing resource.

4. The method of claim 3, wherein the computing resource metric comprises one or more of a heat profile, a heat tolerance, a noise level, error rates, quantities of qubits for error correction, error correction strategies, CPU performance, T1 and T2 times, and qubit availability of a quantum computing system.

5. The method of claim 1, wherein the priority rules comprise a list of conditions indicating the action to initiate when a condition in the list of conditions is met.

6. The method of claim 5, wherein the conditions correspond to the computing resources sensitivities for at least some quantum services of the plurality of quantum services.

7. The method of claim 1, wherein initiating the action comprises:
   determining, based on the dependency map, quantum services from among the plurality of quantum services that are dependent on the quantum service;
   initiating a copy of the quantum service;
   directing the quantum services that are dependent on the quantum service to use the copy of the quantum service; and
   terminating the quantum service.

8. The method of claim 7, wherein initiating the copy of the quantum service comprises:
   obtaining a QIF corresponding to the quantum service;
   sending the QIF to the quantum services that are dependent on the quantum service; and
   executing the copy of the quantum service in a quantum computing system from among the one or more quantum computing systems.

9. The method of claim 1, wherein initiating the action comprises:
   determining, based on the dependency map, quantum services from among the plurality of quantum services that are dependent on the quantum service;
   notifying the quantum services that are dependent on the quantum service of an interruption in the quantum service;
   determining, based on the dependency map, quantum services from among the plurality of quantum services that the quantum service is dependent on;
   notifying the quantum services that the quantum service is dependent on of an interruption in the quantum service; and
   pausing the quantum service.

10. The method of claim 9, further comprising:
subsequent to pausing the quantum service, monitoring a stability of the one or more quantum computing systems where the quantum service was executing;
determining that the one or more quantum computing systems stabilized; and
executing the quantum service on the one or more quantum computing systems.

11. The method of claim 10, further comprising:
monitoring levels of computing resources of the one or more quantum computing systems; and
determining that the levels of computing resources are below a threshold indicating that the one or more quantum systems is unstable.

12. The method of claim 1, wherein initiating the action comprises:
determining, based on the dependency map, quantum services from among the plurality of quantum services that are dependent on the quantum service;
pausing the quantum services that are dependent on the quantum service;
determining, based on the dependency map, quantum services from among the plurality of quantum services that the quantum service is dependent on;
pausing the quantum services that the quantum service is dependent on; and
terminating the quantum service.

13. The method of claim 12, further comprising:
subsequent to pausing the quantum services that are dependent on the quantum service, terminating the quantum services that are dependent on the quantum service.

14. The method of claim 12, further comprising:
subsequent to pausing the quantum services that the quantum service is dependent on, terminating the quantum services that the quantum service is dependent on.

15. A quantum computing device, comprising:
a memory; and
a processor device coupled to the memory, the processor device to:
determine a plurality of quantum services executing on one or more quantum computing systems;
access a dependency map identifying dependency relationships between the plurality of quantum services comprising at least one of a dependent upstream relationship or a dependent downstream relationship;
determine computing resource sensitivities for at least some quantum services of the plurality of quantum services;
determine, based on the computing resource sensitivities for a quantum service from among the plurality of quantum services, that the quantum service exceeds a computing resource sensitivity threshold for the quantum service; and
in response to determine that the quantum service exceeds the computing resource sensitivity threshold, initiate, based on priority rules specifying an action to stabilize the plurality of quantum services, the action to stabilize the plurality of quantum services.

16. The quantum computing device of claim 15, wherein, to initiate the action, the processor device is further to:
determine, based on the dependency map, quantum services from among the plurality of quantum services that are dependent on the quantum service;
initiate a copy of the quantum service;
direct the quantum services that are dependent on the quantum service to use the copy of the quantum service; and
terminate the quantum service.

17. The quantum computing device of claim 16, wherein, to initiate the copy of the quantum service, the processor device is further to:
obtain a QIF corresponding to the quantum service;
send the QIF to the quantum services that are dependent on the quantum service; and
execute the copy of the quantum service in a quantum computing system from among the one or more quantum computing systems.

18. The quantum computing device of claim 15, wherein, to initiate the action, the processor device is further to:
determine, based on the dependency map, quantum services from among the plurality of quantum services that are dependent on the quantum service;
notify the quantum services that are dependent on the quantum service of an interruption for the quantum service;
determine, based on the dependency map, quantum services from among the plurality of quantum services that the quantum service is dependent on;
notify the quantum services that the quantum service is dependent on of an interruption for the quantum service; and
pause the quantum service.

19. The quantum computing device of claim 15, wherein, to initiate the action, the processor device is further to:
determine quantum services from among the plurality of quantum services that are dependent on the quantum service;
pause the quantum services that are dependent on the quantum service;
determine, based on the dependency map, quantum services from among the plurality of quantum services that the quantum service is dependent on;
pause the quantum services that the quantum service is dependent on; and
terminate the quantum service.

20. A non-transitory computer-readable storage medium that includes computer-executable instructions that, when executed, cause one or more processor devices to:
determine a plurality of quantum services executing on one or more quantum computing systems;
access a dependency map identifying dependency relationships between the plurality of quantum services comprising at least one of a dependent upstream relationship or a dependent downstream relationship;
determine computing resource sensitivities for at least some quantum services of the plurality of quantum services;
determine, based on the computing resource sensitivities for a quantum service from among the plurality of quantum services, that the quantum service exceeds a computing resource sensitivity threshold for the quantum service; and
in response to determine that the quantum service exceeds the computing resource sensitivity threshold, initiate, based on priority rules specifying an action to stabilize the plurality of quantum services, the action to stabilize the plurality of quantum services.

* * * * *